US012544547B2

(12) United States Patent
Khademhosseini et al.

(10) Patent No.: US 12,544,547 B2
(45) Date of Patent: Feb. 10, 2026

(54) GELATIN-BASED MICRONEEDLE PATCH FOR MINIMALLY-INVASIVE EXTRACTION OF BODILY FLUIDS

(71) Applicant: THE REGENTS OF THE UNIVERSITY OF CALIFORNIA, Oakland, CA (US)

(72) Inventors: Alireza Khademhosseini, Los Angeles, CA (US); Wujin Sun, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 838 days.

(21) Appl. No.: 17/791,452

(22) PCT Filed: Jan. 7, 2021

(86) PCT No.: PCT/US2021/012550
§ 371 (c)(1),
(2) Date: Jul. 7, 2022

(87) PCT Pub. No.: WO2021/142160
PCT Pub. Date: Jul. 15, 2021

(65) Prior Publication Data
US 2023/0321419 A1  Oct. 12, 2023

Related U.S. Application Data

(60) Provisional application No. 62/959,592, filed on Jan. 10, 2020.

(51) Int. Cl.
A61M 37/00 (2006.01)
(52) U.S. Cl.
CPC . A61M 37/0015 (2013.01); A61M 2037/0061 (2013.01)

(58) Field of Classification Search
CPC ............ A61M 37/00; A61M 37/0015; A61M 2037/0061; A61B 5/145; A61B 5/15; A61B 5/00
(Continued)

(56) References Cited

U.S. PATENT DOCUMENTS 9,743,870 B2    8/2017  Wang et al.
2016/0166185 A1* 6/2016  Liepmann ........ A61B 5/150503
                                              600/365
(Continued)

FOREIGN PATENT DOCUMENTS

WO  WO 2018/160140      9/2018
WO  WO-2018160140 A1 *  9/2018 ........ A61M 37/0015
(Continued)

OTHER PUBLICATIONS

PCT International Search Report for PCT/US2021/012550, Applicant: The Regents of the University of California, Form PCT/ISA/210 and 220, dated Mar. 18, 2021 (3 pages).
(Continued)

Primary Examiner — Phillip A Gray
(74) Attorney, Agent, or Firm — VISTA IP LAW GROUP LLP

(57) ABSTRACT

A gelatin-based (e.g., gelatin methacryloyl (GelMA)) patch is disclosed with an array of microneedles (MNs) for minimally invasive sampling of bodily fluids such as interstitial fluid (ISF). The properties of the patch can be tuned by altering the concentration of the GelMA prepolymer and the crosslinking time. The GelMA-based MN patch demonstrated efficient extraction of ISF. Furthermore, in experimental testing, the patch efficiently and quantitatively detects glucose and vancomycin in ISF in an in vivo study. This minimally invasive approach of extracting ISF with a GelMA microneedle enables to detection and analysis of
(Continued)

target molecules from patients. The target molecules captured in the patch may be released and analyzed to detect the presence of and/or concentration of target molecules. In other embodiments, the patch itself may be analyzed directly to detect the presence of and/or concentration of target molecules.

20 Claims, 14 Drawing Sheets

(58) Field of Classification Search
USPC .......................................................... 604/22
See application file for complete search history.

(56) References Cited

U.S. PATENT DOCUMENTS

| | | | |
|---|---|---|---|
| 2016/0242689 | A1 | 8/2016 | Roehr et al. |
| 2016/0303185 | A1 | 10/2016 | Herschkowitz et al. |
| 2018/0263539 | A1 | 9/2018 | Javey et al. |
| 2019/0030211 | A1 | 1/2019 | Nam et al. |
| 2019/0192611 | A1 | 6/2019 | Yang et al. |
| 2019/0216363 | A1 | 7/2019 | Holmes et al. |
| 2021/0076988 | A1 | 3/2021 | Wang et al. |
| 2021/0386985 | A1 | 12/2021 | Khademhosseini et al. |

FOREIGN PATENT DOCUMENTS

| | | | |
|---|---|---|---|
| WO | WO 2018/202922 | 11/2018 | |
| WO | WO-2018202922 A1 * | 11/2018 | ............. A61B 5/685 |
| WO | WO 2020/092229 | 5/2020 | |
| WO | WO 2021/022231 | 2/2021 | |
| WO | WO 2021/119332 | 6/2021 | |
| WO | WO 2021/119546 | 6/2021 | |
| WO | WO 2021/142160 | 7/2021 | |
| WO | WO 2021/195129 | 9/2021 | |
| WO | WO 2021/216186 | 10/2021 | |
| WO | WO 2021/216614 | 10/2021 | |
| WO | WO 2021/225826 | 11/2021 | |
| WO | WO 2021/252673 | 12/2021 | |
| WO | WO 2022/010698 | 1/2022 | |
| WO | WO 2022/031497 | 2/2022 | |
| WO | WO 2022/040177 | 2/2022 | |

OTHER PUBLICATIONS

PCT Written Opinion of the International Search Authority for PCT/US2021/012550, Applicant: The Regents of the University of California, Form PCT/ISA/237, dated Mar. 18, 2021 (6 pages).
Sharif Abdelghany et al., Nanosuspension-Based Dissolving Microneedle Arrays for Intradermal Delivery of Curcumin, Pharmaceutics 2019, 11, 308; doi:10.3390/pharmaceutics11070308.
A. Bigi et al., Mechanical and thermal properties of gelatin lms at dilerent degrees of glutaraldehyde crosslinking, Biomaterials 22 (2001) 763}768.
Michael S. Boyne et al., Timing of Changes in Interstitial and Venous Blood Glucose Measured With a Continuous Subcutaneous Glucose Sensor, Diabetes, vol. 52, Nov. 2003, 2790-2794.
Batzaya Byambaa et al., Bioprinted Osteogenic and Vasculogenic Patterns for Engineering 3D Bone Tissue, Adv. Healthcare Mater. 2017, 6, 1700015 (16 pages).
Na Cao et al., Preparation and physical properties of soy protein isolate and gelatin composite films, Food Hydrocolloids 21 (2007) 1153-1162.
Patricia Gonzalez-Vázquez et al., Transdermal delivery of gentamicin using dissolving microneedle arrays for potential treatment of neonatal sepsis, Journal of Controlled Release 265 (2017) 30-40.
Jessica C. Joyce et al., Extended delivery of vaccines to the skin improves immune responses, J Control Release. Jun. 28, 2019; 304: 135-145. doi:10.1016/j.jconrel.2019.05.006.
Chandana Kolluru et al., Monitoring drug pharmacokinetics and immunologic biomarkers in dermal interstitial fluid using a microneedle patch, Biomed Microdevices; 21(1): 14. doi:10.1007/s10544-019-0363-3.
Qiu Yu Li et al., A solid polymer microneedle patch pretreatment enhances the permeation of drug molecules into the skin, RSC Adv., 2017, 7, 15408.
Shiqi Lin et al., Strategy for hypertrophic scar therapy: Improved delivery of triamcinolone acetonide using mechanically robust tip-concentrated dissolving microneedle array, Journal of Controlled Release 306 (2019) 69-82.
Daniela Loessner et al., Functionalization, preparation, and use of cell-laden gelatin-methacryloyl-based hydrogels as modular tissue culture platforms, Nature Protocols, vol. 11, No. 4, pp. 727-746. https://doi.org/10.1038/nprot.2016.037.
Zhimin Luo et al., Biodegradable Gelatin Methacryloyl Microneedles for Transdermal Drug Delivery, Adv Healthc Mater. Feb. 2019 ; 8(3): e1801054. doi:10.1002/adhm.201801054.
Anasuya Mandal et al., Cell and fluid sampling microneedle patches for monitoring skin-resident immunity, Science Translational Medicine 10, 467 (Nov. 2018): eaar2227.
Karen Mooney et al., Parents' perceptions of microneedle-mediated monitoring as an alternative to blood sampling in the monitoring of their infants, International Journal of Pharmacy Practice 2015, 23, pp. 429-438.
Jason W. Nichol et al., Cell-laden microengineered gelatin methacrylate hydrogels, Biomaterials. Jul. 2010 ; 31(21): 5536-5544. doi:10.1016/j.biomaterials.2010.03.064.
Conor O'Mahony et al., Piezoelectric inkjet coating of injection moulded, reservoir-tipped microneedle arrays for transdermal delivery, J. Micromech. Microeng. 29 (2019) 085004 (8pp).
Rajesh Paul et al., Extraction of Plant DNA by Microneedle Patch for Rapid Detection of Plant Diseases, ACS nano 2019, 13, 6540 (35 pages).
Kaveh Rahimi Mamaghania et al., Synthesis and microstructural characterization of GelMa/PEGDA hybrid hydrogel containing graphene oxide for biomedical purposes, Materials Today: Proceedings 5 (2018) 15635-15644.
Pradnya P. Samant et al., Mechanisms of sampling interstitial fluid from skin using a microneedle patch, PNAS, May 1, 2018, vol. 115, No. 18, 4583-4588.
Dana Al Sulaiman et al., Hydrogel-coated microneedle arrays for minimally-invasive sampling and sensing of specific circulating nucleic acids from skin interstitial fluid, ACS Nano. Aug. 27, 2019; 13(8): 9620-9628. doi:10.1021/acsnano.9b04783.
Mingyue Sun et al., Synthesis and Properties of Gelatin Methacryloyl (GelMA) Hydrogels and Their Recent Applications in Load-Bearing Tissue, Polymers 2018, 10, 1290; doi:10.3390/polym10111290.
Jinqiang Wang et al., Charge-switchable polymeric complex for glucose-responsive insulin delivery in mice and pigs, Wang et al., Sci. Adv. 2019; 5 : eaaw4357 (11 pages).
Peng Xue et al., ReviewBlood sampling using microneedles as a minimally invasive platform forbiomedical diagnostics. Applied Materials Today 13 (2018) 144-157.
Kan Yue et al., Synthesis, properties, and biomedical applications of gelatin methacryloyl (GelMA) hydrogels, Biomaterials. Dec. 2015 ; 73: 254-271. doi: 10.1016/j.biomaterials.2015.08.045.
Kan Yue et al., Structural analysis of photocrosslinkable methacryloyl-modified protein derivatives, Biomaterials. Sep. 2017 ; 139: 163-171. doi:10.1016/j.biomaterials.2017.04.050.
Jicheng Yu et al., Microneedle-array patches loaded with hypoxia-sensitive vesicles provide fast glucose-responsive insulin delivery, PNAS, Jul. 7, 2015, vol. 112, No. 27, 8260-8265.
Jicheng Yu et al., Glucose-responsive insulin patch for the regulation of blood glucose in mice and minipigs, Nat Biomed Eng. May 2020; 4(5): 499-506. doi:10.1038/s41551-019-0508-y.
Xin Zhao et al., Photocrosslinkable Gelatin Hydrogel for Epidermal Tissue Engineering, Adv Healthc Mater. Jan. 7, 2016; 5(1): 108-118. doi:10.1002/adhm.201500005.
Kai Zhu et al., Gold Nanocomposite Bioink for Printing 3D Cardiac Constructs, Adv Funct Mater. Mar. 24, 2017; 27(12): doi: 10.1002/adfm.201605352.

(56) References Cited

OTHER PUBLICATIONS

Dan Dan Zhu et al., Kinetic stability studies of HBV vaccine in a microneedle patch, International Journal of Pharmaceutics 567 (2019) 118489.
Hao Chang et al., A Swellable Microneedle Patch to Rapidly Extract Skin Interstitial Fluid for Timely Metabolic Analysis, Adv. Mater. 2017, 29, 1702243 (8 pages).
Xiaoxuan Zhang et al., Encoded Microneedle Arrays for Detection of Skin Interstitial Fluid Biomarkers, Adv. Mater. 2019, 31, 1902825 (8 pages).
Huu Thuy Trang Duong et al., Smart pH-Responsive Nanocube-Controlled Delivery of DNA Vaccine and Chemotherapeutic Drugs for Chemoimmunotherapy, ACS Appl. Mater. Interfaces 2019, 11, 13058-13068.
Hongyao Du et al., Hyaluronic Acid-Based Dissolving Microneedle Patch Loaded with Methotrexate for Improved Treatment of Psoriasis, ACS Appl. Mater. Interfaces 2019, 11, 43588-43598.
PCT International Preliminary Report on Patentability (Chapter I of the Patent Cooperation Treaty) for PCT/US2021/012550, Applicant: The Regents of the University of California, Form PCT/IB/326 and 373, dated Jul. 21, 2022 (8 pages).

\* cited by examiner

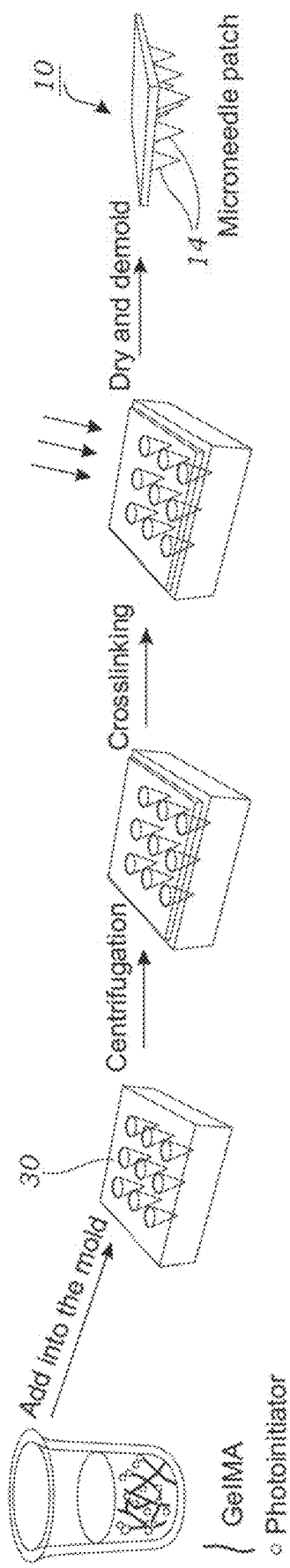
*FIG. 3A*
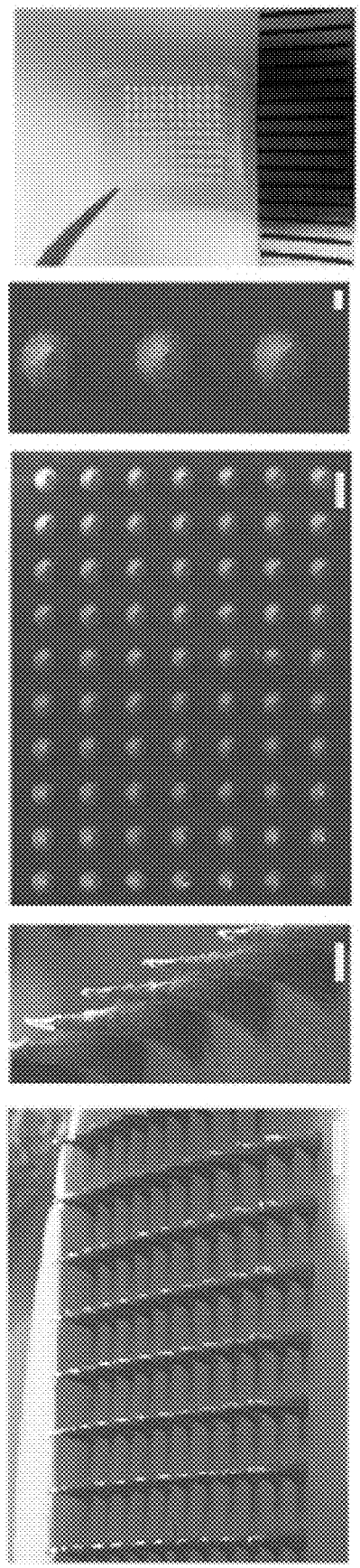
*FIG. 3B*  *FIG. 3C*  *FIG. 3D*  *FIG. 3E*  *FIG. 3F*

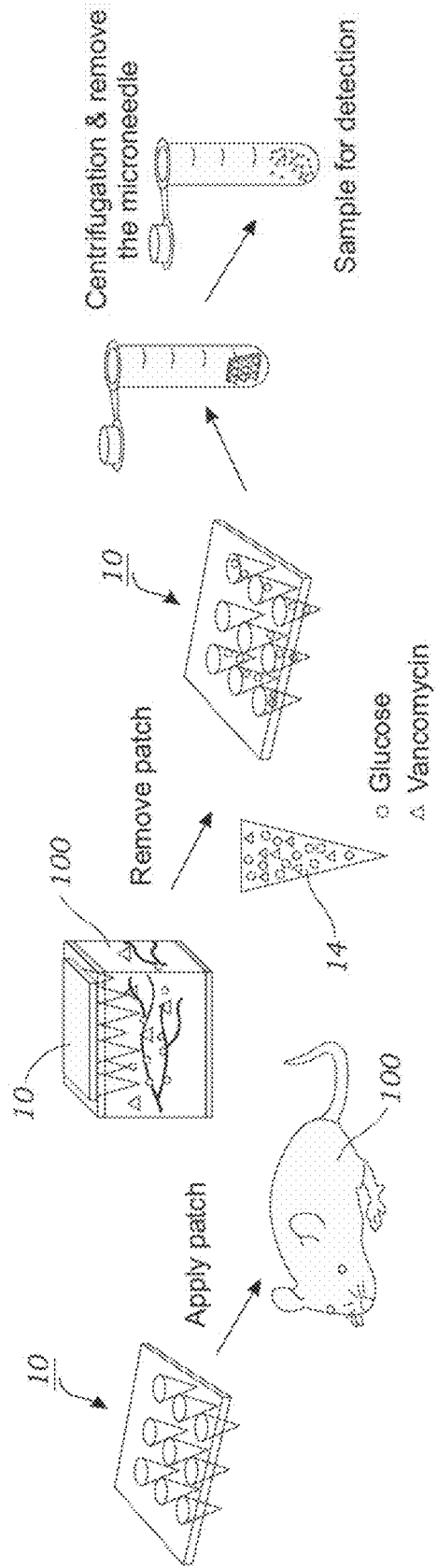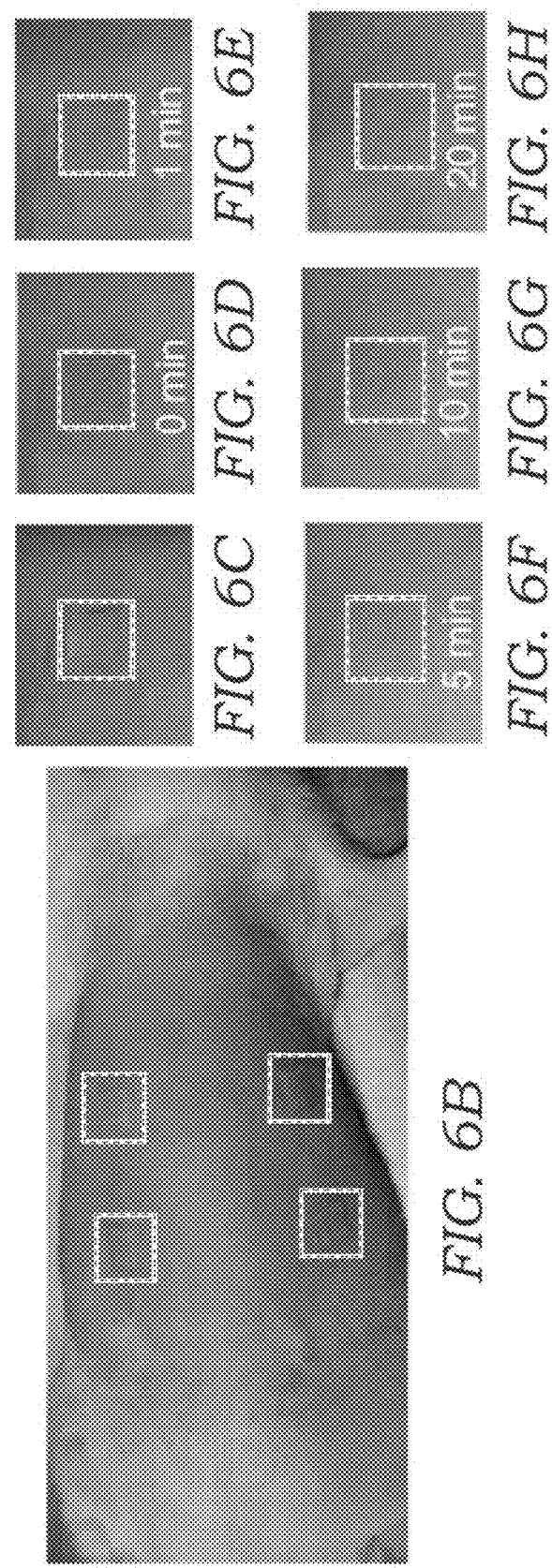

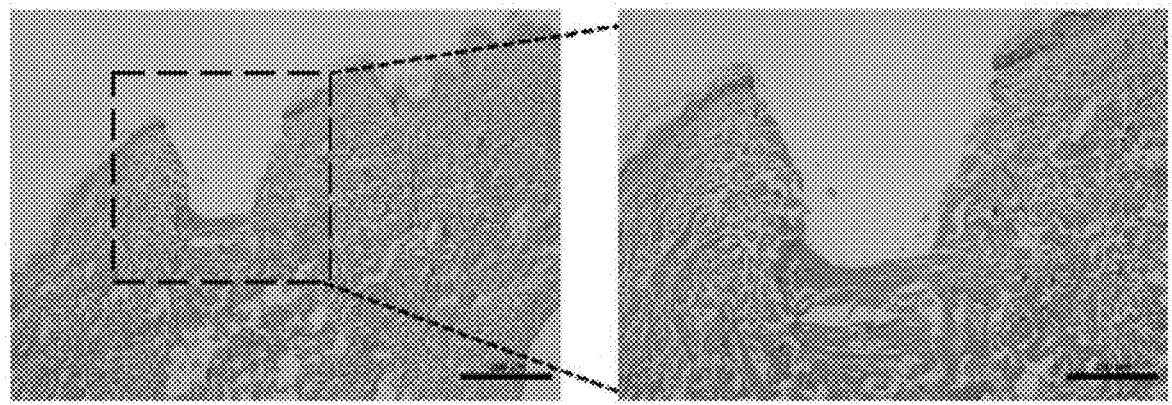
*FIG. 7A*　　　　　*FIG. 7B*
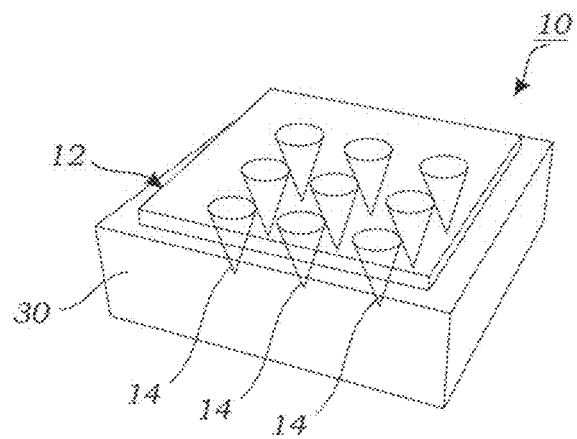
*FIG. 8*
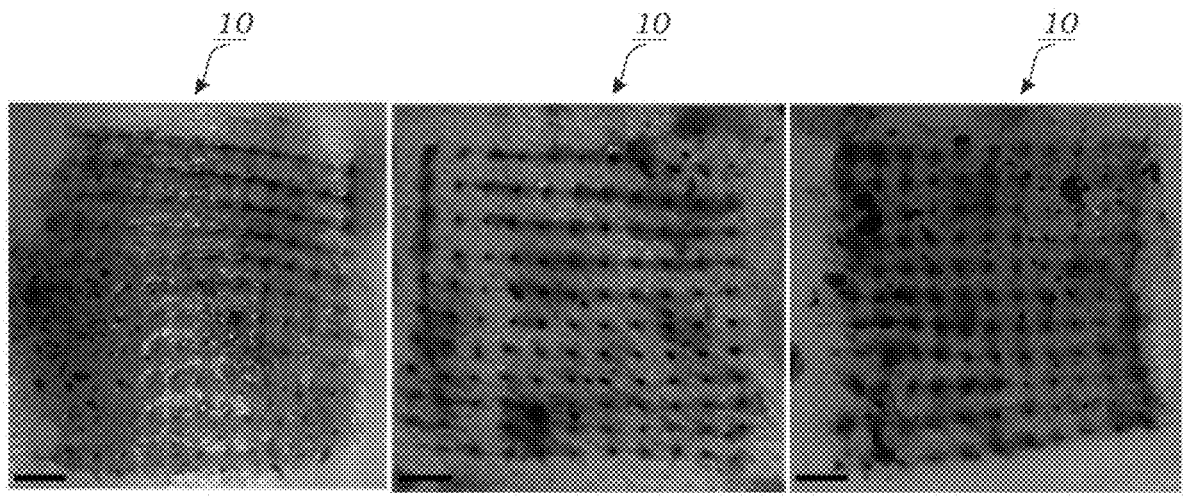
*FIG. 9A*　　　*FIG. 9B*　　　*FIG. 9C*

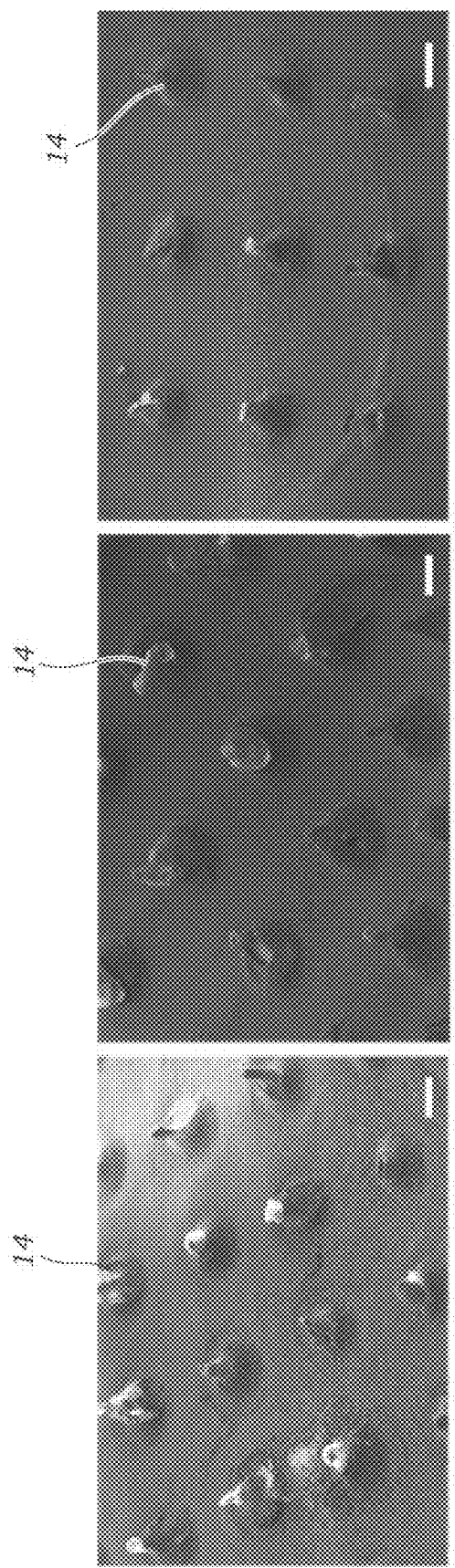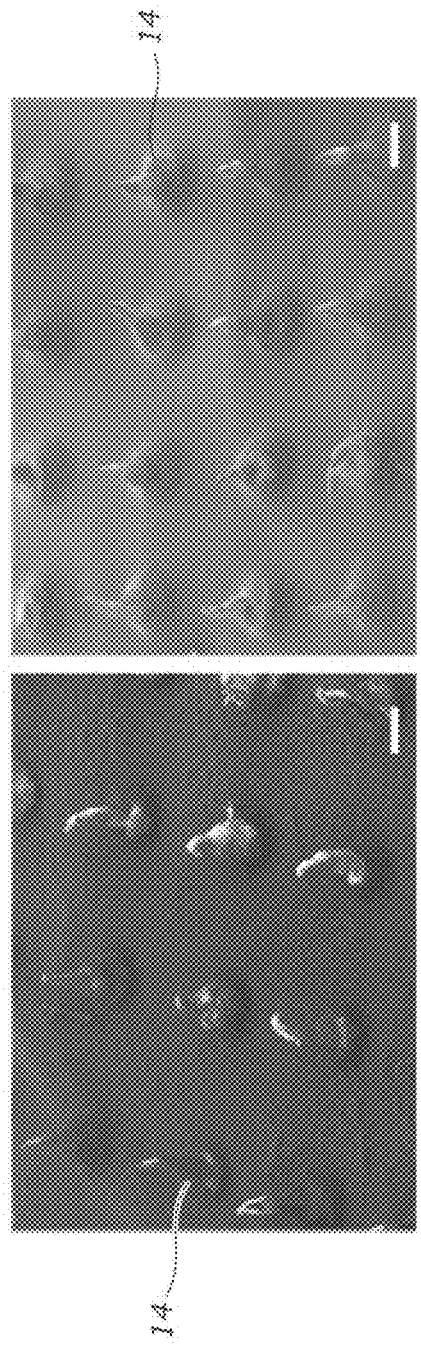

GELATIN-BASED MICRONEEDLE PATCH FOR MINIMALLY-INVASIVE EXTRACTION OF BODILY FLUIDS

RELATED APPLICATION

This Application is a U.S. National Stage filing under 35 U.S.C. § 371 of International Application No. PCT/US2021/012550, filed on Jan. 7, 2021, which claims priority to U.S. Provisional Patent Application No. 62/959,592 filed on Jan. 10, 2020, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Numbers EB023052, EB024403, GM126831, and HL140618, awarded by the National Institutes of Health. The government has certain rights in the invention.

TECHNICAL FIELD

The technical field generally relates to biocompatible microneedles. More particularly, the technical field relates to a patch that incorporates gelatin-based microneedles for the minimally-invasive extraction of bodily fluids such as interstitial fluids from live mammalian skin tissue.

BACKGROUND

The ability to detect biomarkers and drugs with minimally invasive methods has attracted widespread attention due to its promise to revolutionize patient screening and the diagnosis of disease. Currently, blood sampling is the clinical standard for tracking patient health and disease progression. However, obtaining blood is generally invasive and may be complicated by infection or anxiety. Moreover, veins that are mechanically weak and prone to collapse increase the difficulty of collecting blood. Beyond the challenges associated with blood collection, circulating blood also has its limit for providing healthcare-related information. In some cases, drug concentration in the blood is poorly correlated with concentration at the target site; some antibiotics have been shown to distribute differently in the blood compared to muscle or other tissues. As a result, there is growing interest in developing alternatives to blood sampling that can provide accurate information about an individual's health status with minimal patient discomfort.

Body fluids (or bodily fluids) other than blood have been investigated for biomarker detection or drug monitoring including interstitial fluid (ISF), saliva, and urine. Saliva and urine sampling are less invasive, but they are limited by their low biomarker content and fluctuating volume. ISF serves as an intermediate between cells and the circulatory system as it surrounds cells throughout the body and acts as a reservoir for biomolecules, nutrients, and waste. Previous studies have demonstrated that protein concentration in ISF is conserved in relation to serum, and nearly all proteins present in serum can be detected in ISF. Moreover, the protein content of ISF is lower than that of blood, facilitating the collection of drugs in their active form and simplifying the detection of some molecules. Furthermore, some biomarkers in ISF are unique as they are not found in serum, suggesting that sampling ISF could expand beyond the diagnostic capabilities of serum for certain diseases.

Sourcing ISF can be simpler than other body fluids. Skin is the largest organ of the human body and is the most convenient source of ISF. Skin ISF is rich in systemic metabolites, biomarkers, as well as drugs. However, the outermost layer of the epidermis, the stratum corneum, is a natural barrier restricting the exchange of fluid. In previous studies, skin ISF has been sampled by a variety of techniques including suction blisters, which require elevated vacuum for >1 h but may cause lasting skin damage. Reverse iontophoresis has been used; however, it is limited to small molecules and requires specialized equipment operated by a trained professional. Another option is microdialysis which requires local anesthesia and medical training. All these collection procedures are time-consuming and limited by the prerequisite specialized equipment and medical expertise. Therefore, a simple and minimally invasive technique that is capable of extracting sufficient quantities of ISF from the skin is urgently needed.

One promising approach for ISF extraction is the use of microneedle (MN) array patches. Historically, microneedles (MNs) were developed for the delivery of drugs, vaccines, biomolecules, or stem cells. The extensive focus on developing MN-based delivery approaches rather than extraction methods may be the result of the lack of excellent ISF-absorbing materials. MNs typically have a length less than 1 mm with tips much sharper than hypodermic needles. Such geometric designs enable MNs to efficiently pierce the stratum corneum and form microscale ISF extraction channels without touching blood vessels, nerve fibers, or their endings present in the epidermis or dermis. Due to their small size and short depth of penetration, MNs provide a painless, simple, and minimally invasive way to sample skin ISF. To evaluate patient compliance with MN-based diagnostics, Mooney et al. interviewed 16 parents with experience of premature birth and the interviewees preferred MN-mediated monitoring over traditional blood sampling in neonates. See Mooney et al., Parents' perceptions of microneedle-mediated monitoring as an alternative to blood sampling in the monitoring of their infants, Int. J. Pharm. Pract., 23, 429 (2015). Based on MNs-mediated fluid extraction strategy, Chang et al. achieved offline analysis of metabolites such as glucose and cholesterol. See Chang et al., A Swellable Microneedle Patch to Rapidly Extract Skin Interstitial Fluid for Timely Metabolic Analysis, Adv. Mater., 29, 1702243 (2017). Zhang et al. devised encoded MNs capable of detecting multiple biomarkers (TNF-α, IL-1β, IL-6). See Zhang et al., Encoded Microneedle Arrays for Detection of Skin Interstitial Fluid Biomarkers, Adv. Mater., e1902825 (2019). Sulaiman et al. developed MNs coated with an alginate-peptide nucleic acid hybrid material for specific nucleic acid sampling and detection. See Sulaiman et al., Hydrogel-Coated Microneedle Arrays for Minimally Invasive Sampling and Sensing of Specific Circulating Nucleic Acids from Skin Interstitial Fluid, ACS Nano, 13, 8, 9620-9628 (2019). Furthermore, the extraction of plant DNA by MNs was demonstrated for rapid detection of plant diseases. See Paul et al., Extraction of Plant DNA by Microneedle Patch for Rapid Detection of Plant Diseases, ACS Nano, June 25; 13(6):6540-6549 (2019). There remains a need for improved MN-mediated extraction devices and methods.

SUMMARY

In one embodiment, a patch having microneedles formed thereon is disclosed that has microneedles formed from a crosslinked gelatin-based material. In a preferred embodiment, the crosslinked gelatin-based material includes gelatin methacryloyl (GelMA). Patches of GelMA were produced with various crosslinking degrees and initial polymer concentrations. By tuning these parameters, swelling and other mechanical properties of the microneedles were optimized for the rapid extraction of ISF. One or more analytes or biomolecules contained in the extracted ISF may then be detected and/or analyzed. This detection and/or analysis may include removing the drugs, analytes, compounds, molecules, or biomarkers from the microneedles. Alternatively, the detection and/or analysis may include direct detection or analysis of the drugs, analytes, compounds, molecules, or biomarkers while present in the patch.

In another embodiment, a method for extracting fluid from living tissue using a patch includes providing a patch comprising a base or substrate having a plurality of microneedles extending away from the surface of the base, wherein the base and the plurality of microneedles are formed from crosslinked gelatin-based material (e.g., gelatin methacryloyl (GelMA) in one particular embodiment). The patch is applied to the living tissue so that the plurality of microneedles penetrate into the living tissue. The patch then absorbs one or more drugs, analytes, compounds, molecules, or biomarkers into the plurality of microneedles. The patch is then removed from the living tissue. In some embodiments, the patch is then subject to an extraction process whereby the drugs, analytes, compounds, molecules, or biomarkers are extracted from the patch and then detected and/or measured for concentration. Alternatively, the drugs, analytes, compounds, molecules, or biomarkers may be detected and/or measured for concentration by direct analysis of the patch.

In one embodiment, the patch is applied to living skin tissue and the fluid that infiltrates the patch is interstitial fluid. In another embodiment, the fluid that infiltrates the patch is blood or blood serum. The fluid may also include combinations or mixtures of the different fluids. The patch may be applied to tissue by the subject (i.e., self-applied) or another health professional. The patch may be maintained on the tissue for seconds, minutes, hours, or longer. In some embodiments, the patch may be removed within one hour of application. Various swelling ratios and compressive moduli can be adjusted or tuned for the various patches. The microneedles of the patch should be hard enough such that they can readily penetrate the tissue. The swelling ratio may vary but, generally, larger swelling ratios are preferred.

In another embodiment, a patch for extracting fluid from living tissue includes a base or substrate having a plurality of microneedles extending away from the surface of the base, wherein the base and the plurality of microneedles are formed from crosslinked gelatin-based material, and wherein the plurality of microneedles contain one or more chromogenic or fluorogenic compounds therein that change color and/or fluorescence in response to the presence of one or more drugs, analytes, compounds, molecules, or biomarkers

BRIEF DESCRIPTION OF THE DRAWINGS

FIG. 3A is a schematic representation of the preparation process used to form the patch. Aqueous GelMA solution (aq) was cast into the PDMS mold. After centrifugation and UV crosslinking, the patch was dried and removed from the mold and ready for use.

FIGS. 3B and 3C are SEM images showing the side view of the GelMA microneedle array.

FIGS. 3D and 3E are SEM images from the top view. Aligned conical needles were formed with an approximate height of 600 μm and bottom diameter of 300 μm. Scale bar: 500 μm in B, D and 100 μm in C, E.

FIG. 3F is a photograph of the GelMA microneedle patch containing an 11×11 array of MNs over a 1 cm×1 cm area.

FIG. 6A illustrates a schematic representation of the extraction process in a rat model.

FIG. 6B illustrates four GelMA microneedle patches were applied into the dorsal skin of a rat.

FIG. 6C illustrates a magnified image of one patch on the skin.

FIG. 6D illustrates a magnified view of the patch showing skin recovery post-treatment at 0 min.

FIG. 6E illustrates a magnified view of the patch showing skin recovery post-treatment at 1 min.

FIG. 6F illustrates a magnified view of the patch showing skin recovery post-treatment at 5 min.

FIG. 6G illustrates a magnified view of the patch showing skin recovery post-treatment at 10 min.

FIG. 6H illustrates a magnified view of the patch showing skin recovery post-treatment at 20 min.

FIGS. 7A and 7B illustrate H&E stained section of rat skin at the GelMA microneedle treated sites. Scale bar: (FIG. 7A) 200 µm, (FIG. 7B) 100 µm.

FIG. 8 illustrates a schematic representation of a GelMA microneedle patch in the PDMS mold.

FIGS. 9A-9C illustrate Trypan blue staining of the MN penetrated rat cadaver skin. The skin was applied GelMA microneedle patches with different initial GelMA concentrations 15% (FIG. 9A), 20% (FIG. 9B) and 25% (FIG. 9C), respectively. Scale bars in FIGS. 9A-9C were 1 mm.

FIGS. 10A-10E illustrate SEM images of GelMA microneedles after pressing against agarose hydrogel containing collagenase type II (2 U/mL) for 10 min. The GelMA microneedles were crosslinked for 10 s (FIG. 10A), 50 s (FIG. 10B), 100 s (FIG. 10C), 200 s (FIG. 10D) and 300 s (FIG. 10E), respectively. Scale bar in FIGS. 10A-10E were 200 µm.

DETAILED DESCRIPTION OF ILLUSTRATED EMBODIMENTS

Figure 1A:
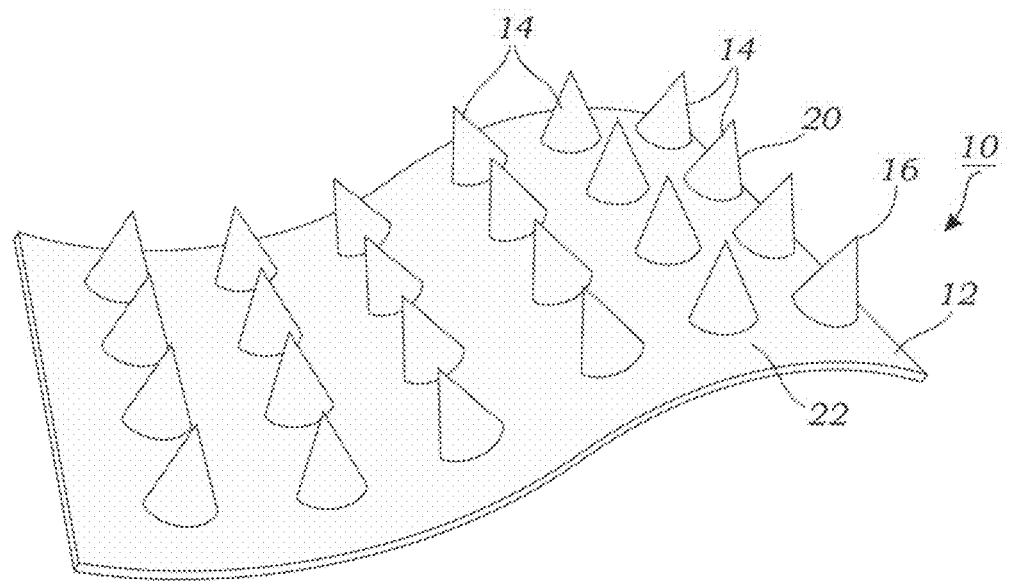
FIG. 1A illustrates a perspective view of a microneedle patch according to one embodiment.

FIG. 1A illustrates a patch 10 for minimally-invasive extraction of bodily fluids according to one embodiment. Bodily fluids include, for example, ISF as well as blood or combinations or mixtures of the same in some embodiments. The patch 10 includes a base or substrate 12 that includes a plurality of microneedles 14 (also referred to herein as MNs) that extend or project from the substrate 12. The patch 10 may, in some embodiments, be partly or entirely biodegradable. In other embodiments, the patch 10 is not biodegradable but is biocompatible. The plurality of microneedles 14 generally extend or project in a perpendicular direction from a surface of the base or substrate 12. The plurality of microneedles 14 may be arranged in a regular repeating array or, alternatively, they may be arranged in a random pattern. In one embodiment, the plurality of microneedles 14 that are formed on the base or substrate 12 may have substantially similar shapes and sizes. However, in other embodiments, the plurality of microneedles 14 may have different shapes and/or sizes.

Figure 1B:
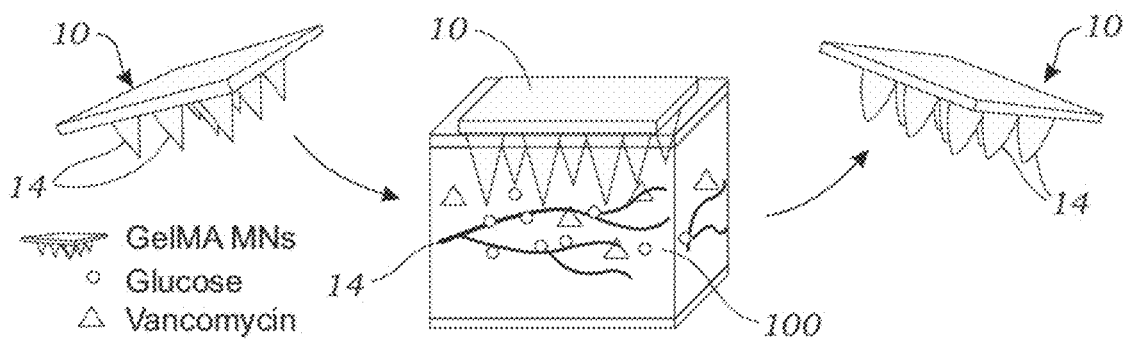
FIG. 1B schematically illustrates a microneedle patch being used to extract glucose and/or vancomycin from ISF as an illustrative example.
Figure 1C:
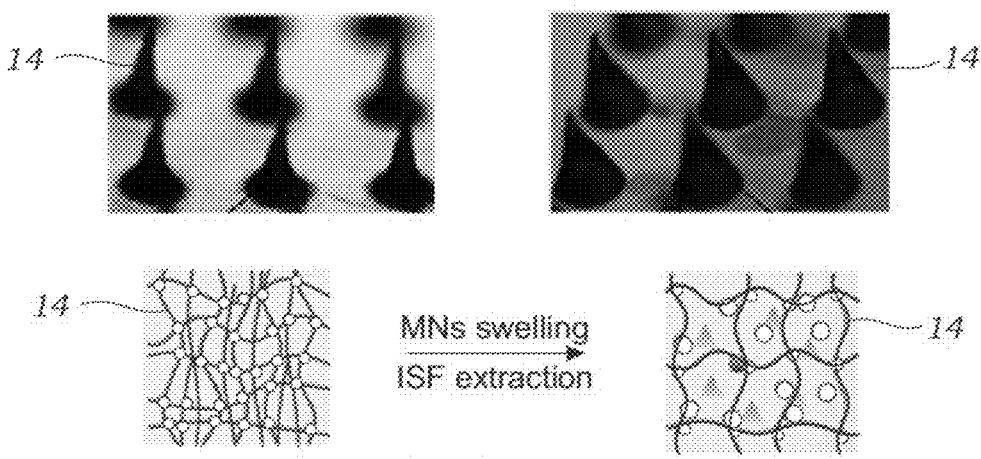
FIG. 1C illustrates SEM images of the microneedles pre (left) and post (right) swelling.

In one particular embodiment, the microneedles 14, as their name implies, have a needle-like shape. For example, the microneedles 14 may include a sharpened tip 16 that aid in penetrating the epidermal layer of the tissue 100 which, in a preferred embodiment, is skin tissue (e.g., as seen in FIG. 1B). The length of the microneedles 14 (measured from base to tip) may vary although typically the microneedles 14 extend less than about 1.5 mm from the base or substrate 12 to the tip 16. A typical length of the microneedles 14 is around 300-700 µm, although the dimensions may extend outside this range (e.g., around 10 µm to around 1,500 µm). In some embodiments, the length of the microneedles 14 may be tuned or varied to extract fluid and molecules/ substances from different depths of tissue 100. The different lengths of microneedles 14 may be on different patches 10 or even within the same patch 10. For example, a single patch 10 could have microneedles 14 of varying length. Likewise, the microneedles 14 on a single patch 10 may have the same shape or different shapes. The base of the microneedle 14 is wider than the tip 16. Typically, the base of the microneedle 14 may have a diameter or width that is less than about 500 µm (e.g., 300 µm base and a height of around 700 µm). The particular dimensions and shape(s) of the microneedles 14 are controlled by the particular construction of the mold that is used to form the patch 10, which is described more in detail below.

Figure 1D:
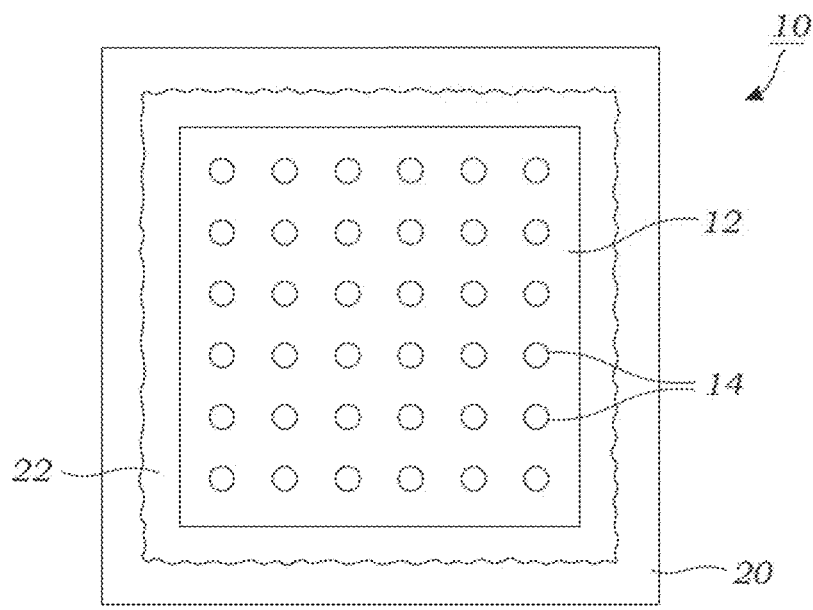
FIG. 1D illustrates a plan view of a patch according to one embodiment.

The base or substrate 12 which holds the microneedles 14 may, in some embodiments, be optionally bonded or otherwise adhered to a backing material 20 (e.g., through the use of an adhesive, chemical linking, or the like) as seen in FIG. 1D. The backing material 20 may be made from a woven fabric, a plastic material such as polyvinylchloride, polyethylene, or polyurethane, or latex. The backing material 20 and base or substrate 12 may be flexible so that the patch 10, when applied, can conformally cover the tissue 100. Optionally, the backing material 20 may include an adhesive material 22 that covers all or a portion of the tissue-facing surface of the backing material 20. For example, adhesive may be formed on the backing material 20 around the periphery of the base or substrate 12 or the backing material 20 so that the base or substrate 12 may be secured in place to the surface of the tissue 100. The adhesive material 22 aids in securing the patch 10 to the tissue 100. The adhesive material 22 may include resins (e.g., vinyl resins), acrylates such as methacrylates epoxy diacrylates. In another embodiment, the adhesive material 22 may be located on the tissue-facing surface of the base or substrate 12.

The base or substrate 12 and the microneedles 14 may be relatively rigid when in the dry state. Because of this, in one alternative embodiment, multiple sub-patches of microneedles 14 may be integrated into the backing material 20 to make the final patch 10. This may be useful for large coverage areas or curved surfaces that may pose a risk of breakage to the base or substrate 12. The various sub-patches of microneedles 14, while generally rigid, are still able to conform to the surface of the tissue 100 due the flexible backing material 20 which enables bending of the overall patch 10. Because individual sub-patches of microneedles 14 are smaller in size these do not experience significant bending stresses which would otherwise cause a larger, rigid structure to break in response to bending and/or manipulation. Bending or flexing can occur within the backing material 20 between the locations of where the sub-patches of microneedles 14 are located (e.g., between the rows and columns of sub-patches).

In one embodiment, the base or substrate 12 and the plurality of microneedles 14 are formed from crosslinked gelatin-based material. In one particular preferred embodiment, the crosslinked gelatin-based material is gelatin methacryloyl (GelMA). GelMA is a derivative of gelatin with modified methacrylamide or methacrylate groups. GelMA may be crosslinked by ultra-violet (UV) or visible light in the presence of a photoinitiator. It is a highly biocompatible material that is commonly used to support cell growth in tissue engineering. The existence of peptide moieties like arginine-glycine-aspartic acid (RGD) for cell attachment as well as for protease degradation makes GelMA a close mimic of the natural extracellular matrix (ECM). In addition, GelMA is a versatile material that can be easily functionalized with various bio-functionalities, such as by encapsulating different molecules including therapeutic agents, growth factors, cytokines, and the like.

The microneedles 14 may have a number of different shapes and configurations including, for example, a pyramid, cone, cylindrical, tapered tip, canonical, square base, pentagonal-base canonical tip, side-open single lumen, double lumen, and side-open double lumen. The plurality of microneedles 14 swell upon breaching or penetrating the biological barrier and absorbing fluid from the surrounding tissue 100 (e.g., ISF). The patch 10 may swell from about 100% to about 500% (wt. basis) depending the initial GelMA concentration and/or crosslinking time (e.g., swelling ratio as defined herein). In other embodiments, the swelling ratio of the patch 10 is within the range of about 200% to about 500%. The compressive modulus of the patches 10 may vary but in one embodiment is within the range of about 2 to about 10 MPa, and in one preferred embodiment, between about 3 MPa to about 8 MPa. The microneedles 14 swell and, in one embodiment, form a flexible hydrogel. Drugs, analytes, compounds, molecules, biomarkers or the like that are located in the tissue 100 (e.g., ISF) are then able to enter into the matrix material of the microneedles 14. These may be endogenous or exogenous molecules or compounds. While glucose and vancomycin are demonstrated herein, this may be used for other biomolecules (e.g., cholesterol). This may occur through diffusion, osmosis, capillary action or through bulk fluid flow from the tissue 100 into the patch 10 (or combinations of these processes).

Figure 2:
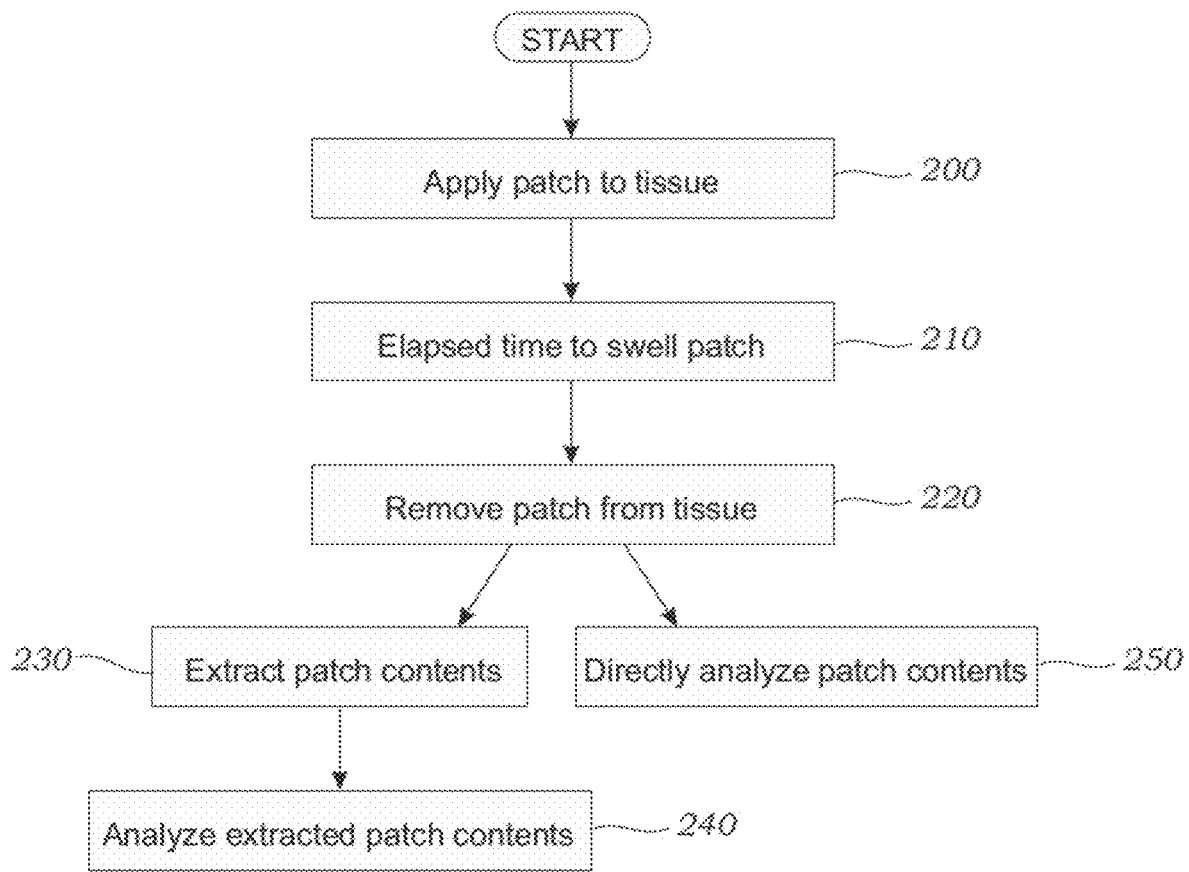
FIG. 2 illustrates a sequence of operations or steps to use the patches disclosed herein.

FIGS. 1B, 2, and 6A illustrates a sequence of operations or steps of using the patch 10 according to one embodiment (FIG. 6A illustrates use in a mouse model). In this embodiment, the patch 10 is applied to tissue 100 as seen in operation 200 of FIG. 2 (and schematically shown in FIGS. 1B and 6A). The patch 10 may be applied to any number of tissue types but has particular applicability to skin tissue 100. For instance, the patch 10 is adhered to skin issue 100 and the microneedles 14 penetrate the tissue including, in one embodiment, the stratum corneum. In other embodiments, the length of the microneedles 14 may be increased further so that blood may interact with the microneedles 14 so that drugs, analytes, compounds, molecules, biomarkers or the like may be extracted from blood using the patch 10. The microneedles 14 then begin to swell and drugs, analytes, compounds, molecules, biomarkers or the like that are located in the tissue 100 then enter into the microneedles 14 and are retained or contained therein. The patch 10 may be applied to the skin tissue 100 and begins to swell along with the extraction of the drugs, analytes, compounds, molecules, biomarkers or the like. The patch 10 is thus allowed to remain adhered to the tissue 100 for a period of elapsed time as seen in operation 210 of FIG. 2. This swelling process (along with extraction of compounds into the microneedles 14) may take place over several minutes or even hours. Generally, the elapsed period of time is less than about 1 hour. After a period of time being exposed the skin tissue 100, the patch 10 is then removed from the skin tissue 100 as seen in operation 220. The patch 10 is then subject to analysis where the presence of one or more drugs, analytes, compounds, molecules, biomarkers or the like are detected and/or their respective concentrations are measured. In one embodiment, as illustrated in operation 230, the contents of the patch 10 are extracted. For example, the patch 10 is incubated in a solution (e.g., buffer or aqueous solution) to extract the drugs, analytes, compounds, molecules, biomarkers or the like from the matrix material of the microneedles 14 and into the solution for subsequent measurement. The drugs, analytes, compounds, molecules, biomarkers or the like diffuse into solution. Of course, in other embodiments, organic or non-polar extraction solvents may be used. This may be accompanied by vigorous mixing or agitation to aid in extracting the drugs, analytes, compounds, molecules, biomarkers or the like. For example, centrifugation may be used to aid in extraction. Here, the patch 10 placed in a tube and then centrifuged. After the contents of the patch have been extracted, the extracted contents are then analyzed as seen in operation 240. This may be accomplished using conventional chemical assays and analysis systems known to those skilled in the art.

In another embodiment, the patch 10 may be analyzed or interrogated directly as seen in operation 250 of FIG. 2. For example, the gelatin-based material of the patch 10 may contain one or more chromogenic or fluorogenic compounds that emit light or change color in response to the presence of one or more drugs, analytes, compounds, molecules, or biomarkers. This may include fluorophores or the like which may be contained in the matrix material of the microneedles 14 or bonded thereto. The patch 10 can be interrogated directly by looking at the color (e.g., hue) or color change that occurs. This also includes fluorescent light that is emitted from the patch 10 (or one or more regions of the patch 10) in response to application of excitation light to the patch 10. The intensity of the color or fluorescent light may be used to determine the concentration of the one or more drugs, analytes, compounds, molecules, or biomarkers. Color or intensity changes over time may also be monitored in certain applications. The chromogenic or fluorogenic compounds may be conjugated directly to the GelMA material of the patch 10 (e.g., through a covalent or other linkage) or entrained therein.

Figure 11:
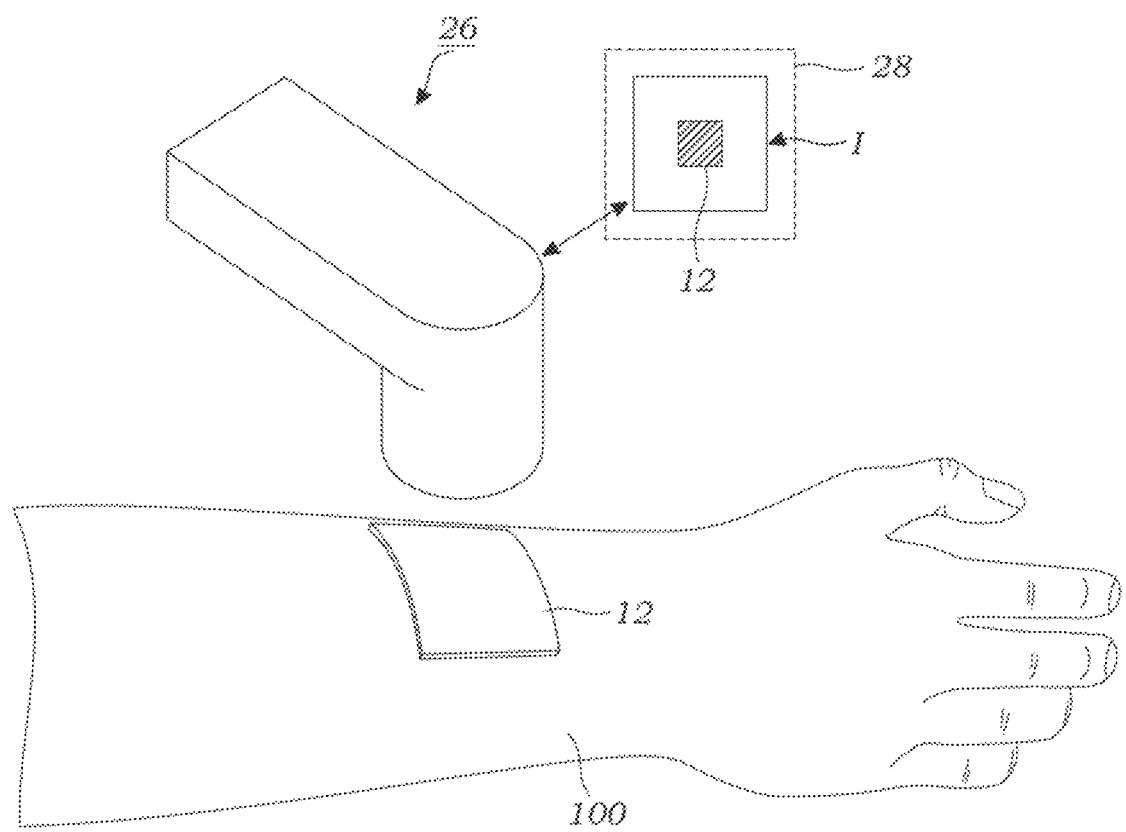
FIG. 11 illustrates an imaging device that is used to obtain one or more images of the patch. The images are processed by image processing software to (1) detect the presence of and/or (2) measure the concentration of one or more drugs, analytes, compounds, molecules, or biomarkers.

FIG. 11 illustrates an imaging device 26 that is used to obtain one or more images I of the patch 10. The images acquired by the imaging device 26 can be analyzed for color or fluorescent light (e.g., hue or intensity may be measured). This may be performed by image processing software 28 contained in the imaging device 26 or a remotely located computer (not shown) where the images I obtained by the imaging device 26 are transferred to and processed. The results can be returned to the imaging device 26. In some embodiments, a separate excitation light source may be needed or this functionality may be incorporated into the imaging device 26. The image processing software 28 may analyze the color (e.g., hue or fluorescent intensity) or fluorescence/color change that occurs in the patch 12 and output a result. The result may include indicia (e.g., tone, visual cue, text on screen or display on imaging device 26) that the target drug, analyte, compound, molecule, or biomarker has been detected or not detected. The result may also include a qualitative or quantitative measure of the drug, analyte, compound, molecule, or biomarker that has been detected. A calibration function, curve or table may be stored in the imaging device 26 and is used to translate the measured image parameter(s) into a result. The imaging device 26 may include, for example, a portable electronic device such as a mobile phone or Smartphone that includes a camera thereon. The camera of portable electronic device may be used to take the images I of the patch 10. Image processing software 28 running on the device (e.g., an application or "app") can then process the image I and output a result to the user which can be displayed on the display or screen.

The patch 10 is manufactured or fabricated by providing a mold 30 such as that illustrated in FIGS. 3A and 8 (e.g., micro-mold) containing a plurality of needle shaped cavities therein. For example, the mold 30 may be formed from a polymer such as polydimethylsiloxane (PDMS). Commercially available microneedle molds such as those made by Blueacre Technology Ltd. (Dundalk, Co Louth, Ireland) may be used. The GelMA is formed using established protocols such as those disclosed in Yue, K., et al., Structural analysis of photocrosslinkable methacryloyl-modified protein derivatives. Biomaterials, 2017. 139: p. 163-171, and Yue et al., Synthesis, properties, and biomedical applications of gelatin methacryloyl (GelMA) hydrogels, Biomaterials, 2015; p. 254-271, which are incorporated herein by reference. Details regarding the formation of GelMa are described in detail therein.

The GelMA is mixed with a photoinitiator (e.g., 2-hydroxy-4'-(2-hydroxyethoxy)-2-methylpropiophenone or Irgacure 2959). Next, the solution of un-crosslinked GelMA that contains the photoinitiator (PI) is then exposed to the mold (FIG. 3A). For example, the mold 30 may be placed in the solution and sonicated (e.g., subject to vibrational forces such as from ultrasonic waves) for a period of time to aid the solution to penetrate into the needle shaped cavities. Alternatively, or in addition to, the mold 30 with the GelMA precursor solution is subject to centrifugation to aid in filling the mold cavities. For example, molds 30 may be placed in the wells of a well plate (or other sample holder) and a small (e.g., ~100 μL of previously prepared GelMA precursor solution is loaded on top of the mold 30). The well plate may be centrifuged at 3,500 rpm for 15 minutes at around 37° C. to let the solution fully enter the mold 30.

Next, the mold 30 (which now contains the cast pre-cursor solution) is irradiated with light to crosslink the GelMA precursor solution. The particular wavelength(s) used to crosslink GelMA may depend on the particular photoinitiator that is used. In some embodiments, visible light may be used to crosslink the GelMA. In other embodiments including those described in the experimental section herein used ultraviolet light (e.g., 350 mW/cm2 UV light (360-480 nm)). The degree of crosslinking of the GelMA is controlled by the length of time that the mold 30 is exposed to ultraviolet light (or other wavelength). Typically, the GelMA is exposed to ultraviolet light for between about 10 seconds and about 500 seconds. Longer crosslinking times result in a higher compressive modulus. It should be understood that crosslinking may take place in less or more time than the range set forth above. The GelMA concentrations used may also vary with higher concentrations of GelMA resulting in a higher compressive modulus. Initial concentrations of GelMA in the range of 10% to 25% (weight/volume or w/v) were tested as explained herein but the invention is not so limited. The mold 30 containing the now crosslinked GelMA is then subject to a drying operation (e.g., dried at around room temperature for about 24 hours). The now formed patch 10 which includes the base or substrate 12 having the microneedles 14 is then removed from the mold 30 (demolding). The patch 10 is applied to the tissue 100 where the microneedles 14 penetrate the tissue 100 (e.g., epidermal layer). Alternatively, the base or substrate 12 may be secured to the backing material 20 to form the final patch 10.

Experimental

The fabrication process of the GelMA patches 10 with microneedles 14 is outlined in FIG. 3A. The patch 10 was prepared by a micro-molding approach, in which GelMA prepolymer was cast into a pre-designed mold 30 by centrifugation. The microstructure of the individual microneedles 14 is illustrated in FIGS. 3B-E. Both the top and side views show conical microneedle structure. Magnified images indicate that the height and bottom diameter of the single microneedle 14 were about 600 and 300 μm, respectively. FIG. 3F is the optical microscopic image of the GelMA microneedle patch 10, which showed an 11×11 array of uniformly aligned microneedles 14 fixed on a 1 cm×1 cm patch 10 to support sufficient ISF extraction for later analysis. Slight shrinkage was observed on the base 12 of the patch 10 since the base part was exposed to air directly (FIG. 8). On the contrary, the GelMA microneedle tips 16 didn't present obvious shrinkage because they are inside the PDMS mold 30 and the pressure from the base 12 during drying process help maintain the shape of tips 16. The shrinkage of the base 12 would have little influence on the mechanical property of the patch 10. The most commonly used techniques to manufacture microneedles 14 with different shapes and sizes include micromolding, lithography, laser cutting, three-dimensional (3D) printing, and wet or dry etching. Here, a polydimethylsiloxane (PDMS) mold 30 was used with a pre-designed shape and size to manufacture the patches 10. The prepared microneedles 14 are 600 μm in height, which is optimal for penetrating of the stratum corneum and preventing the skin wrapping effect. Longer microneedles 14 could be used, for example, to reach blood.

Figure 4A:
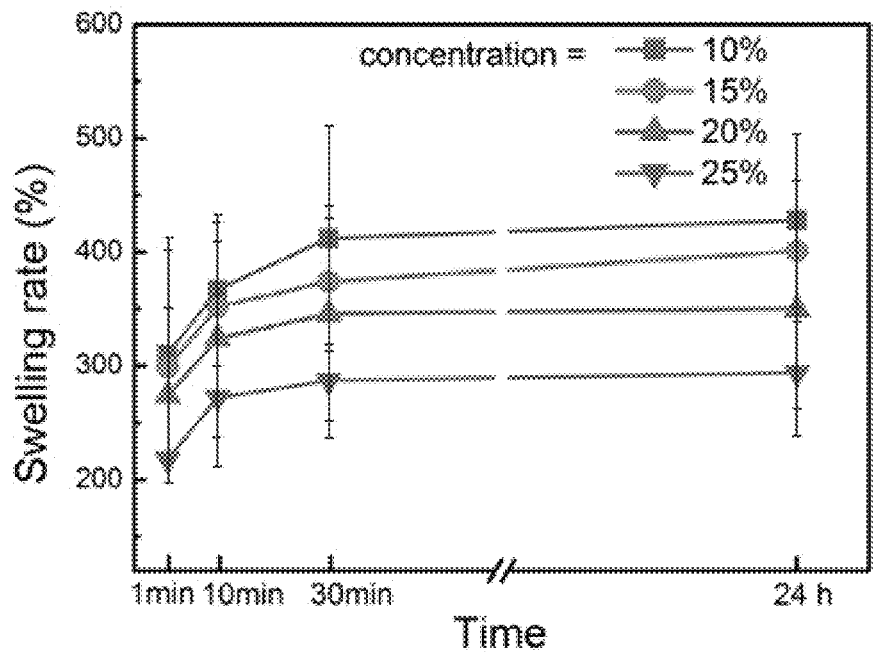
FIG. 4A illustrates swelling rate of the patches with different GelMA concentrations (n=5).
Figure 4B:
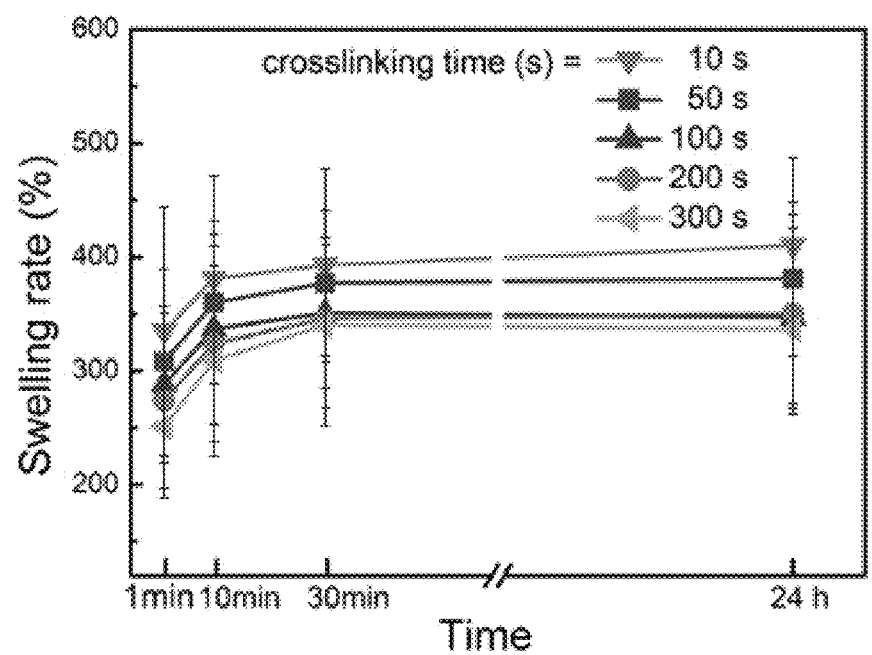
FIG. 4B illustrates swelling rate of the patches with different crosslinking durations.
Figure 4C:
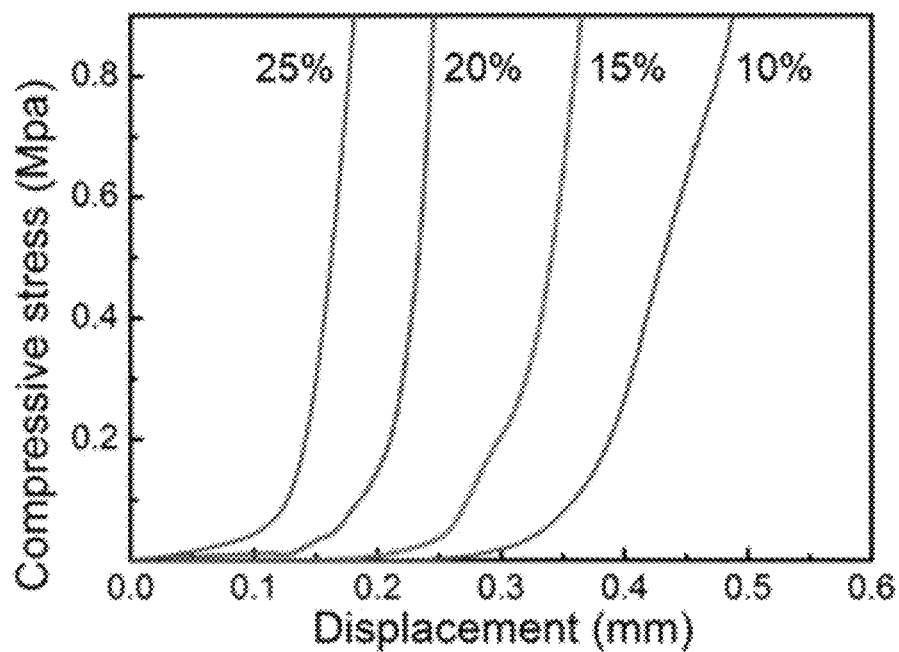
FIG. 4C illustrates stress-strain curves of patches with different GelMA concentrations.
Figure 4D:
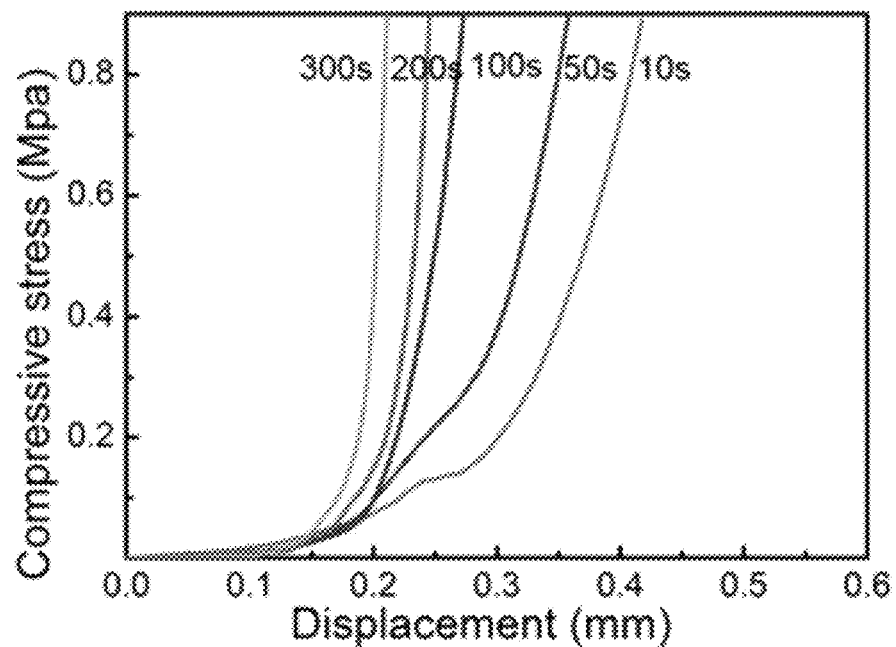
FIG. 4D illustrates stress-strain curves of patches with different crosslinking durations.
Figure 4E:
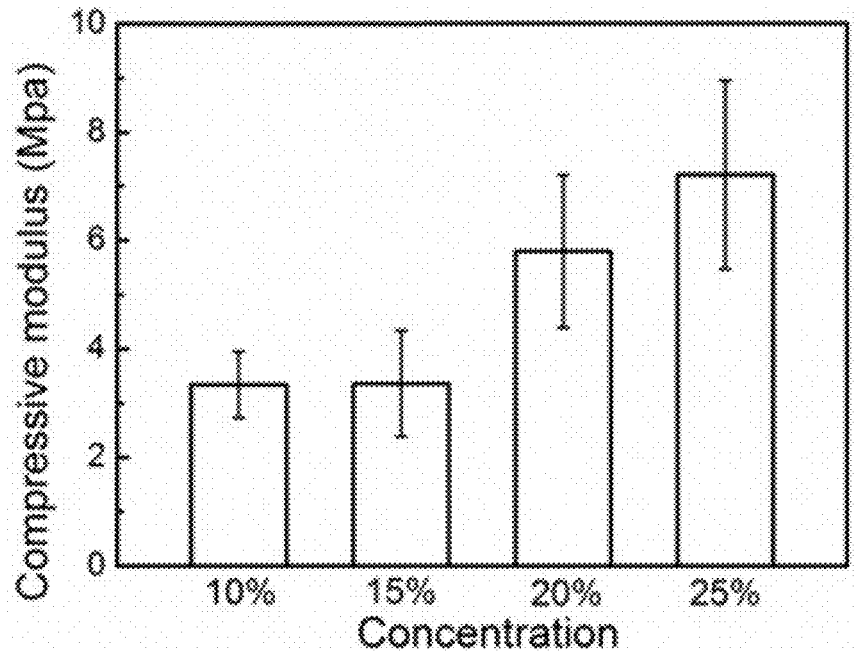
FIG. 4E illustrates compressive moduli of microneedles with different GelMA concentrations (n=3).
Figure 4F:
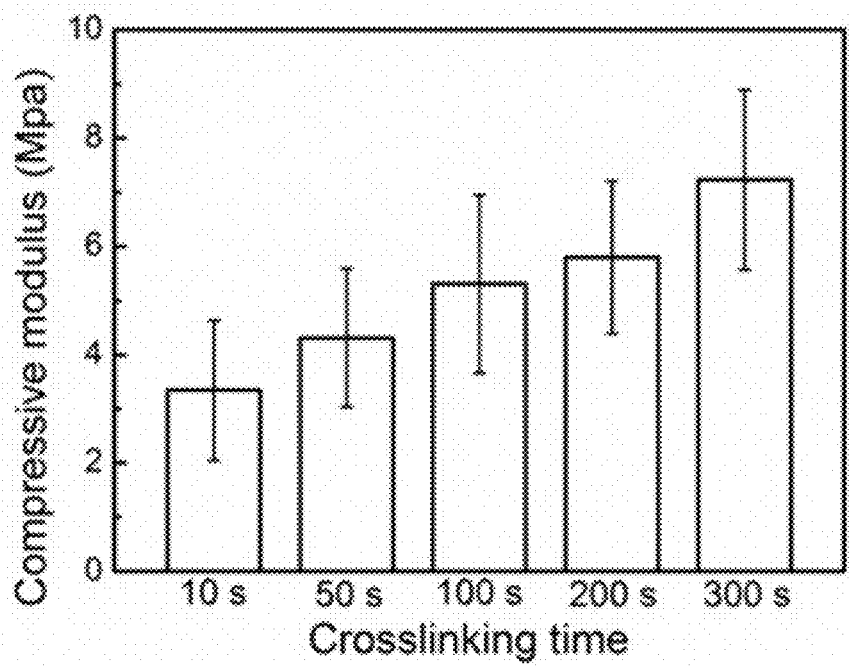
FIG. 4F illustrates compressive moduli of microneedles with different crosslinking durations (n=3). The crosslinking time in FIGS. 4C and 4E was set to 200 s. The initial GelMA concentration in FIG. 4D and FIG. 4F was 20% (m/v).

The swelling and mechanical properties of various GelMA microneedle patches 10 are shown in FIGS. 4A-4F. The dimensions of the patches 10 changed and achieved equilibrium upon immersion in DPBS solution for 24 h. As shown in FIG. 4A, final swelling ratios ranged from 293±69% to 423±62% as the initial GelMA concentration was varied from 25% to 10% (m/v) and the crosslinking time was set to 200 s. It was observed that the swelling ratio is inversely correlated with the GelMA concentration. FIG. 4B shows that the final swelling ratios varied between 337±67% and 410±79% as the crosslinking time was changed from 300 s to 10 s when initial GelMA concentration was 20% (m/v). Longer crosslinking exposures lead to lower swelling ratios of the GelMA microneedle patches 10 in the first 10 min. Similar trend has also been observed at other concentrations of gelatin. It is also worth noting that rapid swelling was observed in the first 10 min following immersion in DPBS solution, indicating rapid liquid absorption by the patches 10. Stress-strain curves of various GelMA patches 10 with different initial concentrations and crosslinking time are presented in FIGS. 4C and 4D, respectively. Enhanced mechanical properties, such as increased compressive stress, were observed with elevated initial GelMA concentrations or increased crosslinking time. The compressive modulus was found to increase non-linearly from 3.35±0.62 MPa to 7.21±1.74 MPa when the GelMA concentration was increased from 10% (m/v) to 25% (m/v). Interestingly, the compressive modulus did not change significantly below a concentration of 20% (m/v), but nearly doubled to 5.80 MPa at 20% (m/v) (FIG. 4E). Furthermore, it was observed that the compressive modulus changed from 3.34±1.33 MPa to 7.23±1.66 MPa when the crosslinking time was varied from 10 to 300 s (FIG. 4F). Thus, the mechanical strength of the microneedles 14 may be tuned in terms of the initial GelMA concentration and crosslinking time.

The influence of methacrylation degree on the swelling ratio and mechanical property of GelMA has also been studied. See Nichol et al., Cell-laden microengineered gelatin methacrylate hydrogels, Biomaterials, 31, 5536 (2010). The results indicated that a higher degree of methacrylation led to a lower swelling ratio or stronger mechanical property when the concentration of initial GelMA was constant.

A series of MN-based designs have been reported corresponding to different ISF sampling mechanisms including (1) diffusion, (2) capillary action, (3) osmosis, and (4) pressure driven convection. These mechanisms are affected by the shape, size, and material of MNs. Among the mechanisms of obtaining ISF from skin using MN patches, ISF collection by diffusion into a hydrogel has not been effective in comparison to the other collection mechanisms. See Samant et al., Mechanisms of sampling interstitial fluid from skin using a microneedle patch, *Proc. Natl. Acad. Sci. USA.*, 115, 4583 (2018). This is mainly due to material properties, especially swelling ratio, rather than a fundamental limitation of the approach. To overcome this challenge, a material with a high swelling ratio is desired for ISF extraction by diffusion. GelMA was selected due to its biocompatibility and composition of primarily gelatin, a natural polymer already used in biomedical engineering applications such as scaffolds, injectable hydrogels, drugs and growth factor carriers, and bioinks for 3D printing. It was observed that the GelMA had swelling properties promising for the extraction of ISF. Here, it was demonstrated that higher initial concentrations of GelMA lead to mechanically stronger GelMA microneedles 14.

Meanwhile, increasing GelMA concentration results in suppressed swelling ratios. A notable increase in compressive modulus has been found between GelMA concentrations of 25% (w/v) and 10% (w/v). The skin penetration of GelMA microneedle patches 10 were tested with different initial concentrations and the results showed that the patches 10 can efficiently penetrate the skin when the initial GelMA concentrations were ≥20% (w/v) (FIGS. 9A-9C). Considering the swelling property, GelMA microneedle patch 10 with initial concentration of 20% (w/v) was chosen. Next, the crosslinking time of the GelMA microneedle patch 10 was optimized. The mechanical test results indicated that longer crosslinking exposure led to stronger mechanical properties of GelMA microneedle patches 10 (FIG. 4F). However, the morphology of GelMA microneedle patches 10 with ≥200 s crosslinking exposures maintained structural integrity while others were partially damaged by the degradation (FIGS. 10A-10E). Considering the time cost and swelling property, a crosslinking time of 200 s was chosen as the optimized condition.

Therefore, optimized GelMA microneedle patches 10 were fabricated with a prepolymer concentration of 20% (w/v) and 200 s of crosslinking time. The swelling ratio at this condition was 324±86% and the compressive modulus was 5.80±1.41 MPa.

Figure 5A:
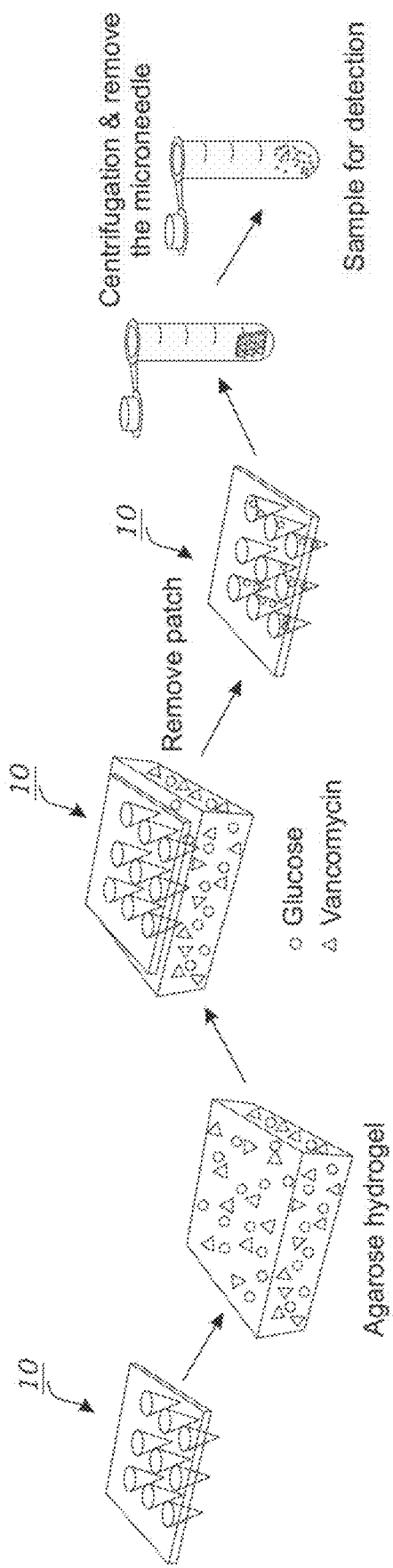
FIG. 5A schematically illustrates the extraction process for the detection of drugs, analytes, compounds, molecules, or biomarkers in tissue (using agarose hydrogel as a tissue model). A GelMA microneedle patch was pressed against agarose hydrogel that was made with defined concentrations of glucose and vancomycin. Then, the patch was removed and transferred to a centrifuge with DI water. After centrifugation, the solution was tested.
Figure 5B:
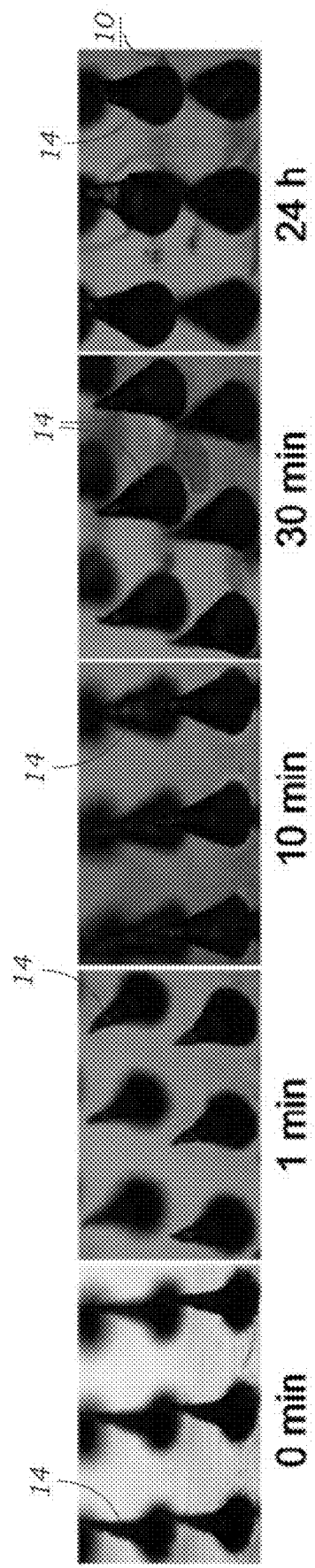
FIG. 5B shows the appearance of GelMA microneedle patch with different extraction durations (0 min, 1 min. 10 min, 30 min, and 24 h).
Figure 5C:
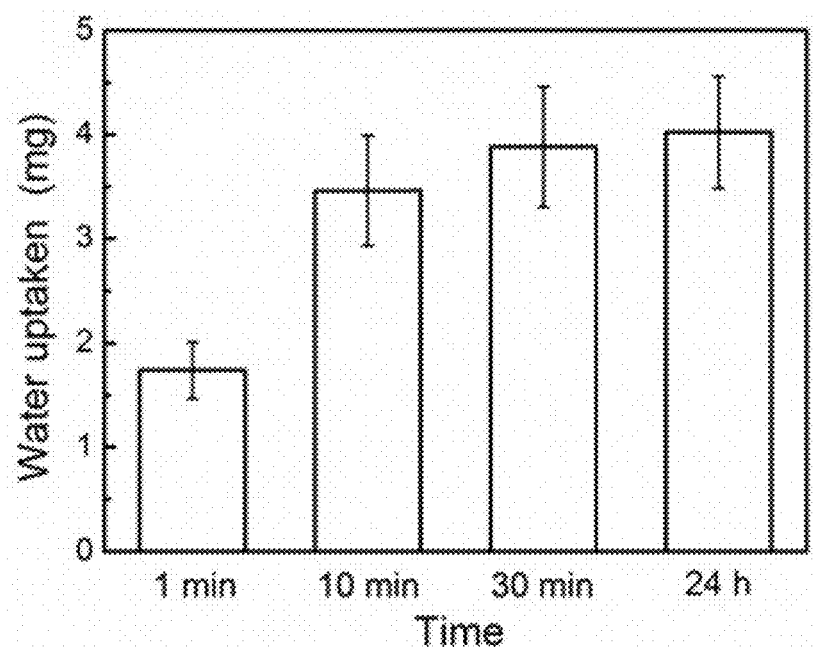
FIG. 5C illustrates histograms showing water uptake by hydrogel at different time points (n=5).
Figure 5D:
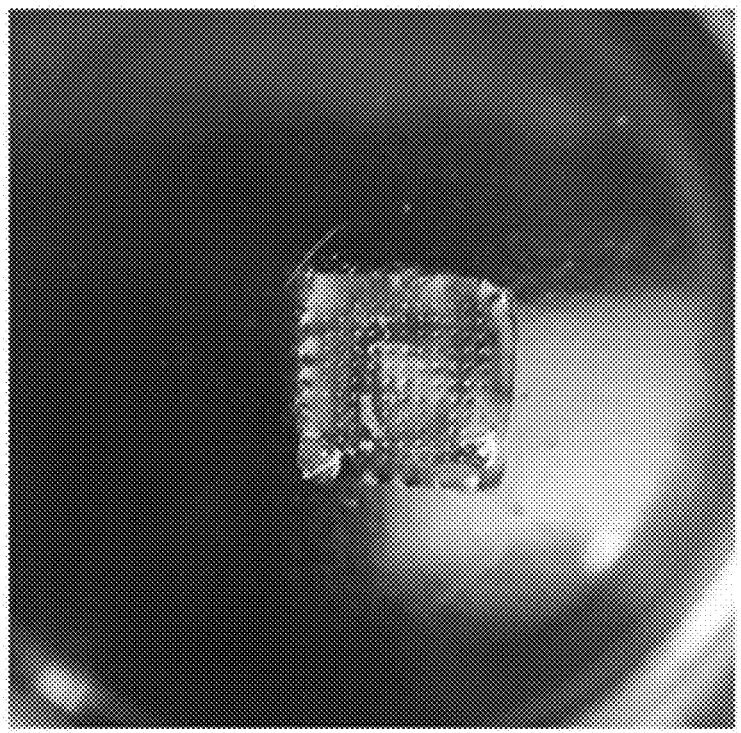
FIG. 5D illustrates the GelMA microneedle patch pressed against the hydrogel.
Figure 5E:
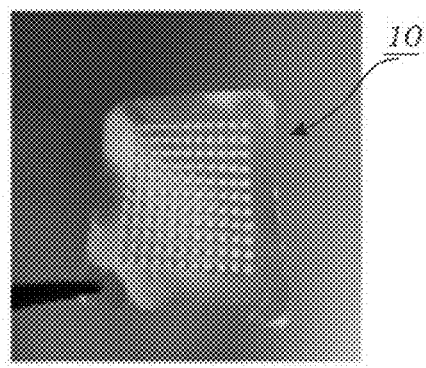
FIG. 5E illustrates a photograph of the of GelMA microneedle patch before extraction.
Figure 5F:
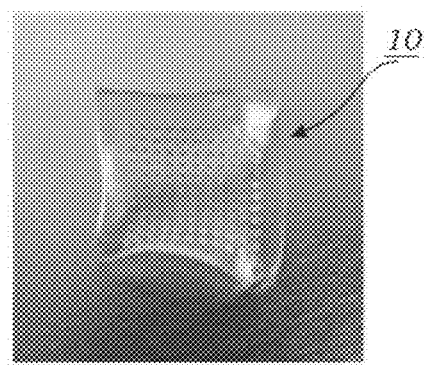
FIG. 5F illustrates a photograph of the of GelMA microneedle patch after extraction.
Figure 5G:
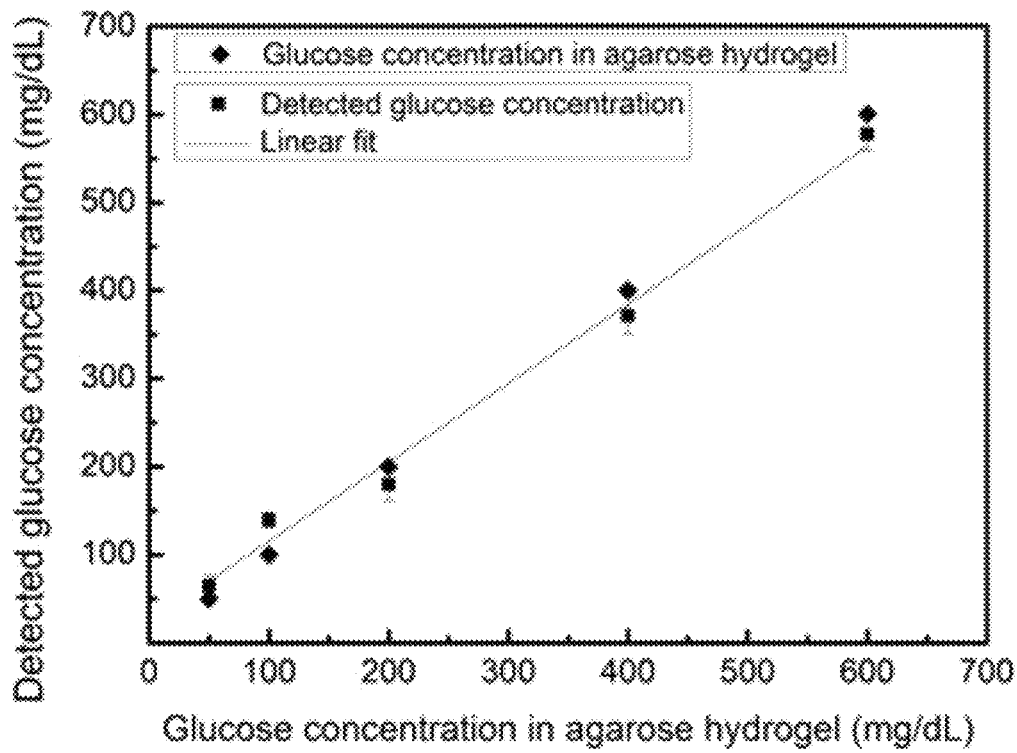
FIG. 5G illustrates a photograph of the detected glucose concentration compared to the real glucose concentration in hydrogel (n=3). The detected glucose concentration was fitted as a line, $R^2=0.981$.
Figure 5H:
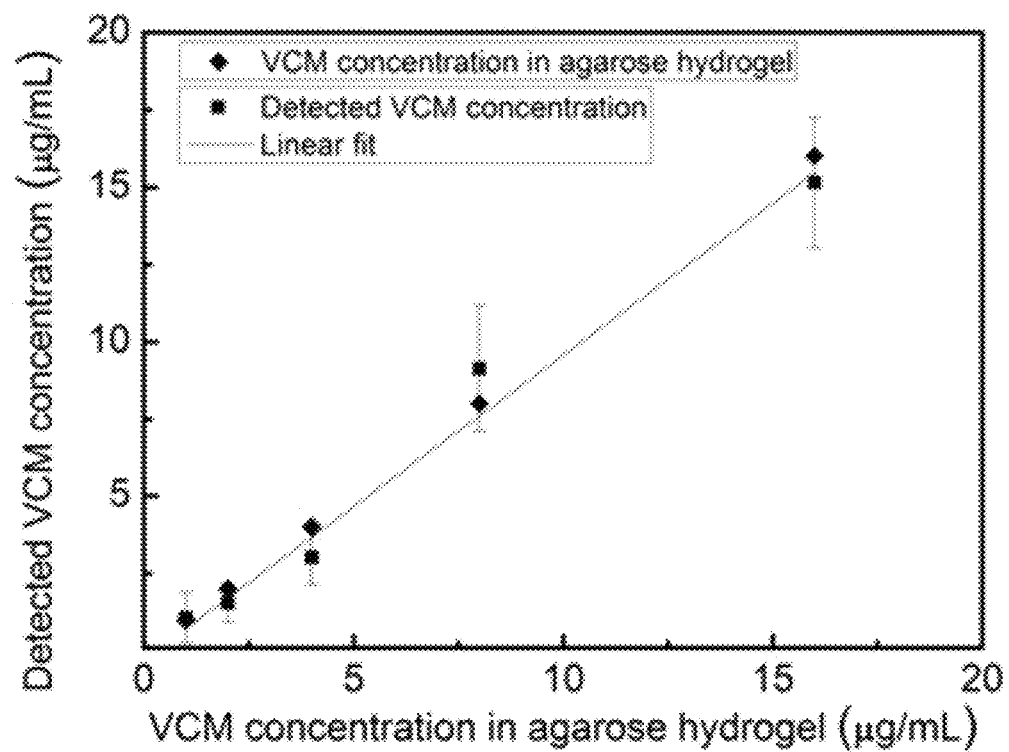
FIG. 5H illustrates the detected vancomycin (VCM) concentration compared to the real VCM concentration in hydrogel (n=3). Detected VCM concentration was also fitted as a line, $R^2=0.974$.

Fluid extraction and molecule detection (glucose and vancomycin) experiments were performed using agarose hydrogels and the results are shown in FIGS. 5A-5H. FIG. 5A shows the process of fluid extraction and biomolecule detection using the GelMA microneedle patches 10. To simulate the fluid extraction, a GelMA microneedle patch 10 was pressed against agarose hydrogels that contain specific concentrations of glucose and vancomycin. Then, the patch 10 was removed and transferred to a centrifuge tube filled with DI water. After centrifugation, the analytes in the solution were tested. The appearance of GelMA microneedle patches 10 after liquid extraction at different time points (0 min, 1 min, 10 min, 30 min and 24 h) are shown in FIG. 5B. The corresponding mass of liquid uptake at each time point is shown in FIG. 5C. The GelMA microneedle patches 10 showed equilibrated absorption of over 4 mg liquid per patch 10 after swelling. FIG. 5D displays the surface of the agarose hydrogel (2.0%, m/v) after treatment with the GelMA microneedle patch 10. FIGS. 5E and 5F show macroscopic images of the GelMA microneedle patches 10 before and after extraction. Detected glucose concentrations were compared to the actual glucose concentrations in hydrogel and the results shown in FIG. 5G. Glucose concentrations in the hydrogel were linearly varied from 50 to 600 mg/dL. Detected glucose concentrations were well-aligned with the actual concentration across the range of concentrations ($R^2=0.981$). In addition, a similar trend was also observed for vancomycin detection (FIG. 5H). Vancomycin concentration in the hydrogel showed a good linearity from 1 to 16 µg/mL. Detected concentrations were well-aligned with the pre-designed concentrations as $R^2=0.974$.

Figure 6I:
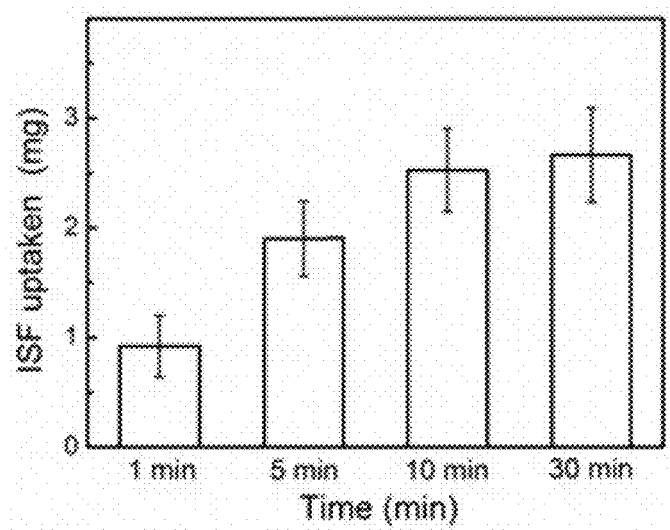
FIG. 6I illustrates a histogram showing effect of ISF uptake at different timepoints (n=5).
Figure 6J:
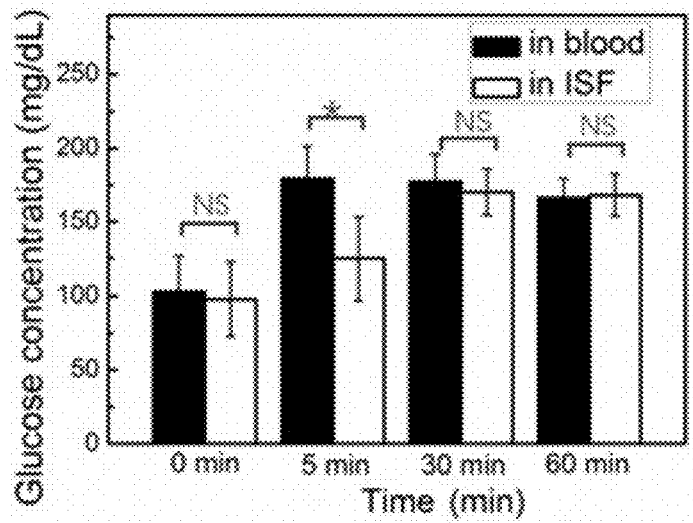
FIG. 6J illustrates a histogram of detected glucose concentrations in ISF compared to glucose concentrations in blood (n=5). *P<0.05, NS means not significant.
Figure 6K:
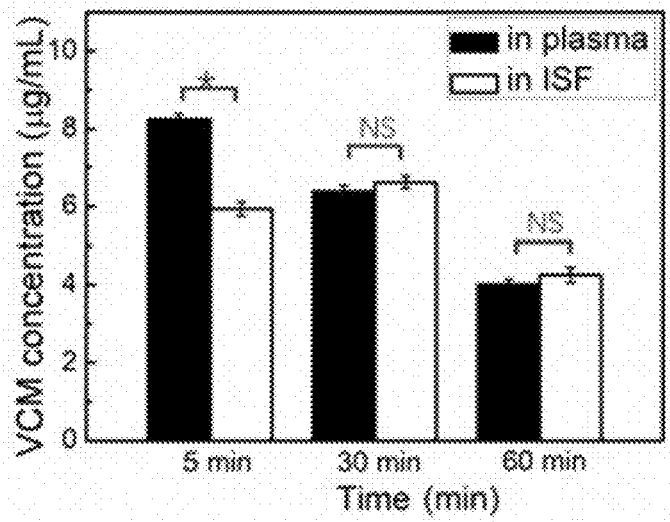
FIG. 6K illustrates a histogram of detected VCM concentrations in ISF compared to VCM concentrations in plasma (n=5). *P<0.05, NS means not significant.

The results of ISF extraction using the patches 10 and analysis in vivo are shown in FIGS. 6A-6K. The schematic (FIG. 6A) describes the procedures used for ISF extraction and analysis, which is similar to the extraction of target molecules in agarose hydrogels. Wistar rats were utilized as a model and each rat was treated with GelMA microneedle patches 10 on their dorsal side (FIG. 6B). The magnified image of the treated skin tissue 100 is shown in FIG. 6C. GelMA microneedles 14 efficiently penetrated the tissue 100 as evidenced by the hematoxylin and eosin (H&E) staining (FIGS. 7A and 7B). FIGS. 6D through 6H showed the recovery of the skin tissue 100 post-treatment (at specified time periods). The microneedle punctures disappeared gradually as the skin recovered within 20 min of removing the patch 10 (FIG. 6H). This indicates that minimal injury was caused and the procedure is, in fact, minimally invasive. The mass of ISF extracted at different treatment time points is shown in FIG. 6I. ISF extraction gradually increased within 10 min of applying the patches 10 and reached equilibrium after approximately 30 min. The mass of ISF collected in the GelMA microneedle patch 10 was about 1.9 mg after 5 min and 2.5 mg after 10 min. Glucose and vancomycin were also utilized as model molecules for the in vivo test and the detected concentrations in ISF were compared to those in blood or plasma as shown in FIGS. 6J and 6K, respectively. The initial glucose concentrations of both samples were approximately 100 mg/dL for both in ISF and blood. Five minutes after intravenous glucose injection, glucose concentration in blood increased rapidly (179.6±21.8 mg/dL) while only marginally increased in ISF (125.1±28.3 mg/dL). However, glucose concentration reached a steady state 30 min after injection with a concentration of 170 mg/dL in both ISF and plasma. A similar trend was also observed for vancomycin detection. Five minutes after the injection, vancomycin concentration in plasma was 8.27±0.13 µg/mL, while it displayed a smaller value (5.93±0.18 µg/mL) in ISF. Over time the concentration of vancomycin in plasma and ISF reached equilibrium: 30 min following injection, vancomycin concentrations in both fluids reached nearly 6.5 µg/mL and decreased to approximately 4 µg/mL 60 min after injection.

Agarose hydrogels are frequently used as models of skin as they can emulate the tissue to predict the in vivo performance of microneedles, including ISF extraction and drug release. In the experiments performed herein, GelMA microneedle patches 10 were used to extract glucose and vancomycin from agarose hydrogels. After applying the patch 10 to the agarose, the shape and size of the patches 10 changed significantly, indicating effective fluid extraction. The results show that GelMA microneedle patches 10 can rapidly and efficiently extract both molecules from an agarose hydrogel. It also demonstrates the utility of GelMA for diffusion-based ISF extraction which has been performed by other materials previously, such as polyvinyl alcohol, poly(methyl vinyl ether-alt-maleic acid) and poly(ethylene glycol). The diffusion of ISF into polyvinyl alcohol-based microneedle patches has been studied and the results showed that only 0.30 µL of ISF could be collected by a single patch over the course of 12 h. Biocompatible, hydrophilic materials have been created based on natural polymers and have been formed into microneedles. Chang et al. (cited herein) demonstrated a methacrylated hyaluronic acid MN patch with the ability to withdraw about 2.3 µL of ISF within 10 min. Compared to these studies, the GelMA microneedle patches 10 also demonstrated sufficient ISF extraction capability in vivo. The GelMA patch 10 collected about 2.5 mg of ISF (~2.5 µL) within 10 min. This improvement is the result of the excellent swelling properties of GelMA and the optimized prepolymer concentration and crosslinking time. While it may be possible to improve the design by incorporating designs such as hollow needles or other features, the fabrication process of the current GelMA microneedle patch 10 is simpler. These swellable microneedle patches 10 are easy to manufacture and can collect ISF from the skin rapidly, making them promising for clinical applications. Moreover, skin recovers almost completely within 20 min of treatment, which further supports its use as a minimally-invasive transdermal ISF extraction device. The GelMA microneedle patch 10 has advantages in lower fabrication cost and higher production yield comparing to HA-based microneedle patches, making it a competitive platform for translational studies. Furthermore, the nature-derived GelMA microneedle patch 10 is derived from extracellular matrix and possesses good biocompatibility as a medical device for sourcing ISF in a convenient and less invasive approach.

To compare the collection of ISF to blood, the detection of injected glucose and vancomycin molecules in skin-derived ISF compared to plasma was studied. Both molecules were detectable and quantifiable in ISF, supporting existing research that ISF is a suitable fluid for diagnosis. Several studies about glucose or vancomycin detection also supported the concentration correlation between ISF and blood in the rat model. However, molecule concentrations in ISF displayed a hysteresis effect. Boyne et al. studied the dynamics of interstitial and blood glucose of patients with type I diabetes and observed a time lag of 4 min to 10 min in the change of interstitial glucose levels relative to blood glucose concentration. See Boyne et al., Timing of Changes in Interstitial and Venous Blood Glucose Measured with a Continuous Subcutaneous Glucose Sensor, Diabetes, 52, 2790 (2003). The time lag of these metabolites or drugs may be caused by locations of metabolites and differing transport efficiencies between ISF and circulating blood. Since the target site of vancomycin, an antibiotic, is the local area surrounding an infected wound, the concentration of vancomycin in the local ISF provides more insight than that in blood. Others have reviewed the pharmacokinetics of many antibiotics and reported a comprehensive summary on pharmacokinetic data suggested that some antibiotics, such as vancomycin, are better suited for detection in ISF because their ISF concentration provides more information into the pharmacokinetic and pharmacodynamic relationships in the target region. However, the pharmacokinetic characteristics of antibiotics in ISF are rarely reported which may be caused by the lack of facile and effective extraction approaches. Therefore, the GelMA microneedle patches 10 that have been developed could serve as an effective tool in pharmacodynamic investigations.

In summary, a swellable GelMA microneedle patch 10 for ISF extraction has been fabricated by using a micromolding method. The swelling and mechanical properties of the patch could be controlled by tuning the prepolymer concentration and crosslinking time. Lower concentrations of GelMA prepolymer lead to higher swelling ratios and lower compressive moduli. Glucose and vancomycin concentrations were comparable when detected in either ISF or plasma, demonstrating that the use of GelMA microneedle patches 10 for ISF extraction from skin tissue 100 can be used to monitor the production and consumption of these molecules. Moreover, rapid recovery of the skin after removing the microneedle patches 10 indicates that the patches 10 exert minimally invasive fluid sampling. This technology has the potential to serve as a minimally invasive supplement or alternative to traditional blood sampling methods that are currently used in the clinic.

GelMA preparation: The GelMA prepolymer was prepared according to previous work. See Loessner et al., Synthesis and microstructural characterization of GelMA/PEGDA hybrid hydrogel containing graphene oxide for biomedical purposes, Nat Protoc., 11, 727 (2016), which is incorporated herein. Briefly, 20 g of gelatin (type A from porcine skin, Sigma) was dissolved in 200 mL of DPBS under constant stirring at 60° C. 16 mL of methacrylic anhydride was added gradually into the solution under vigorous stirring for 3 h at 50° C. Afterwards, 1 L of DPBS (50° C.) was added. The residual methacrylic anhydride was removed by dialysis (12-14 kDa membrane) at 50° C. for 7 days. The GelMA prepolymer was obtained after lyophilization at −20° C. and was stored at 4° C. before use.

GelMA microneedle preparation: A specified amount of GelMA prepolymer (0.2 g, 0.3 g, 0.4 g, or 0.5 g) was dissolved in 2 mL of DI water at 50° C. and 10 mg of photoinitiator (Irgacure 2959, Sigma) was added at 60° C. The GelMA solution was cast onto the PDMS mold 30 and centrifuged for 5 min at 3500 rpm. The filled mold was exposed to 500 mW/cm2 UV light (360-480 nm) for 10 s, 50 s, 100 s, 200 s, or 300 s. Following the exposure, the mold 30 was kept away from light for 24 h to dry the GelMA microneedles 14. The GelMA microneedles 14 on the base 12 were subsequently peeled from the mold 30 and stored at 4° C. before use.

Swelling of GelMA microneedle patches: To calculate the swelling ratio of the GelMA microneedle patches 10, samples were incubated in DPBS for 1 min, 10 min, 30 min, and 24 h at 37° C. After the specified durations, residual liquids on the surface of the patch 10 were removed and the wet weights ($W_w$) were recorded. The dry weights ($W_d$) were measured after lyophilization and the swelling ratio was calculated as $[(W_w-W_d)/W_d]\times100\%$. To predict the structural stability of swelled microneedles 14 in vivo, the GelMA microneedle patches 10 with different crosslinking time (10 s, 50 s, 100 s, 200 s, and 300 s) were pressed against agarose hydrogel (2%, m/v) containing 2 U/mL of collagenase type II at 37° C., respectively. Ten minutes later, the patches 10 were peeled off and dried for scanning electron microscope (SEM) observation.

Mechanical properties of GelMA microneedle patches: The mechanical properties of the patches 10 were measured by a low-force mechanical testing system (5943 MicroTester, Instron, USA) according to the related work. Briefly, the patch 10 was placed needle-side up on a stainless-steel plate and compressed with a load cell at a rate of 1 mm/min up to the maximum loading force of 50 N. Correlations between the applied force and deformation of the patch were recorded during the whole testing process. The compressive modulus (E) represented the slope of stress ($\sigma$)–strain ($\varepsilon$) curve during the elastic deformation of the microneedles 14 and was calculated by $E=\sigma/\varepsilon$. The stress ($\sigma$) and strain ($\varepsilon$) were calculated by $\sigma=F/S$ and $\varepsilon=v(t-t_0)$, where F was the compressive force, S was the sectional area of the testing substance, v was the constant rate of the load cell (1 mm/min), t represented the time of elastic deformation, to represented the time point when the load cell touch the top of testing substance (the force began to be recorded).

Skin penetration by GelMA microneedle patches: The patches 10 with different initial GelMA prepolymer concentration (15%, 20%, 25%) were pushed into the rat cadaver skin for 30 s, respectively. Trypan blue was used to stain the penetrated tissue after peeling off the patch 10. Excess trypan blue was washed by DPBS and the skin was imaged to check for the sign of penetrated stratum corneum (seen as blue dots).

In vitro extraction and glucose and vancomycin detection: Glucose and vancomycin were dissolved in 2% (m/v) agarose hydrogels to model ISF extraction in vitro. The concentrations of glucose were 50, 100, 200, 400, 600 mg/dL and the concentrations of vancomycin were 1, 2, 4, 8, 16 μg/mL. After the dry weight of the GelMA microneedle patch 10 was recorded, the patch 10 was pressed into the agarose hydrogel. Five minutes later, the patch 10 was removed and the wet mass ($W_w$) of the patch 10 was measured. The patch 10 was then transferred into a centrifuge tube with 200 μL of DI water. After being centrifuged at 12000 rpm for 10 min, the solution in the tube was transferred for molecule quantification. The glucose concentration in the hydrogel was tested using a Glucose Assay Kit (Sigma) and the vancomycin concentration in hydrogel was tested using the LC-MS/MS system (API 4000). The mobile phase was distilled water-methanol (9:1, v/v) at a flow rate of 0.2 mL/min. The analytical column was a Gemini 5 μm NX-C18 (100×2 mm). Multiple reaction-monitoring (MRM) analyses were performed using transitions at m/z 725.5→144.0.

The detected concentration was calculated as $C=C_d \times V/[(W_w-W_d) \times \rho]$, in which $C_d$ is the concentration of glucose detected by the kit or concentration of vancomycin detected by the LC-MS/MS system. V is the volume of DI water added into the centrifuge tube (200 μL), $W_d$ is the dry weight of the GelMA microneedle patch 10, $W_w$ is the wet weight of the GelMA microneedle patch 10 after extraction, and p is the density of glucose or vancomycin solution (approximately 1.0 g/mL).

In vivo collection of ISF and glucose and vancomycin detection: All animal experiments were approved by the Animal Care and Use Committee of University of California, Los Angeles, and procedures for animals were performed in accordance with the relevant guidelines and regulations. Wistar rats (4-week-old, approximately 70-80 g) were anesthetized with 50 mg/kg sodium pentobarbital. The dorsal hair of each rat was shaved. After the initial mass of the GelMA patch 10 was weighed, it was applied to the dorsal skin of the rat using the thumb and index finger. Gauze was used to fix the patches 10 on the skin. ten minutes later, the patch 10 was removed and the final mass was recorded. To quantify the concentration of the delivered molecules, the wet patch 10 was transferred into a centrifuge tube with 200 μL of DI water. After centrifugation at 12000 rpm for 10 min, the solution in the tube was transferred to be tested. In addition, blood samples were also collected from the tail vein for glucose detection and the plasma was isolated via centrifugation for vancomycin detection. For histopathology, the skin was harvested and fixed in 10% neutral buffered formalin (BBC Biochemical, WA, USA), processed by a standard method, and embedded in paraffin. 4 μm in thickness tissue sections were stained with hematoxylin and eosin (H&E, BBC Biochemical) to confirm that GelMA microneedles 14 effectively penetrate the skin.

In the glucose detection experiment, the rats were intravenously injected with 1 mL of 0.2 g/mL glucose in saline. The glucose concentrations in ISF were tested using Glucose Assay Kit (Sigma) and the glucose levels in blood were tested using a glucometer (Clarity Diagnostics, US). In the vancomycin detection experiment, the rats were intravenously injected with 1 mL vancomycin at a concentration of 1 mg/mL in saline. The vancomycin concentration in ISF and plasma samples was also quantified by LC-MS/MS analysis (mentioned above).

Statistical analysis: Analysis of variance (ANOVA) was used to test for statistical significance. The results were considered statistically significant when P<0.05. All values are reported as mean±standard deviation (S.D.).

While embodiments of the present invention have been shown and described, various modifications may be made without departing from the scope of the present invention. The invention, therefore, should not be limited, except to the following claims, and their equivalents.

What is claimed is:

1. A method for extracting fluid from living tissue using a patch comprising:
   providing a patch comprising a base or substrate having a plurality of microneedles extending away from the surface of the base, wherein the base and the plurality of microneedles are formed from crosslinked gelatin-based material and wherein the patch has a swelling ratio between about 100% to about 500% (wt. basis);
   applying the patch to the living tissue so that the plurality of microneedles penetrate into the living tissue;
   absorbing one or more drugs, analytes, compounds, molecules, or biomarkers contained in the fluid of the living tissue into the plurality of microneedles; and
   removing the patch from the living tissue.

2. The method of claim 1, wherein the gelatin-based material comprises methacryloyl (GelMA).

3. The method of claim 1, further comprising:
   extracting the one or more drugs, analytes, compounds, molecules, or biomarkers from the plurality of microneedles.

4. The method of claim 3, further comprising detecting the presence of the one or more drugs, analytes, compounds, molecules, or biomarkers extracted from the plurality of microneedles.

5. The method of claim 3, further comprising measuring the concentration of the one or more drugs, analytes, compounds, molecules, or biomarkers extracted from the plurality of microneedles.

6. The method of claim 1, further comprising analyzing the removed patch directly to determine the presence and/or concentration of the one or more drugs, analytes, compounds, molecules, or biomarkers.

7. The method of claim 6, wherein analyzing comprises detecting a color and/or color change of the patch.

8. The method of claim 6, wherein analyzing comprises detecting fluorescence light emitted from the patch.

9. The method of claim 1, wherein the plurality of microneedles absorb interstitial fluid or blood.

10. The method of claim 1, wherein the patch has a swelling ratio between about 200% to about 500% (wt. basis).

11. The method of claim 1, wherein the patch has a compressive modulus within the range of about 2 to about 10 MPa.

12. The method of claim 1, wherein the patch has a compressive modulus within the range of about 3 MPa to about 8 MPa.

13. The method of claim 1, wherein the one or more drugs, analytes, compounds, molecules, or biomarkers comprises an endogenous molecule or compound.

14. The method of claim 1, wherein the one or more drugs, analytes, compounds, molecules, or biomarkers comprises an exogenous molecule or compound.

15. The method of claim 1, wherein the plurality of microneedles have varying lengths.

16. The method of claim 1, wherein the plurality of microneedles have a chromogenic or fluorogenic compound contained therein that is responsive to one or more drugs, analytes, compounds, molecules, or biomarkers extracted from the plurality of microneedles.

17. The method of claim 1, wherein the patch is removed less than one hour after applying the patch to the living tissue.

18. A patch for extracting fluid from living tissue comprising:
a base or substrate having a plurality of microneedles extending away from the surface of the base, wherein the base and the plurality of microneedles are formed from crosslinked gelatin-based material, and wherein the plurality of microneedles contain one or more chromogenic or fluorogenic compounds therein that change color and/or fluorescence in response to the presence of one or more drugs, analytes, compounds, molecules, or biomarkers, wherein the patch has a swelling ratio between about 100% to about 500% (wt. basis).

19. The patch of claim 18, further comprising an imaging device configured to obtain an image of the patch.

20. A method for extracting fluid from living tissue using a patch comprising:
providing a patch comprising a base or substrate having a plurality of microneedles extending away from the surface of the base, wherein the base and the plurality of microneedles are formed from crosslinked gelatin-based material and wherein the patch has a compressive modulus within the range of about 2 to about 10 MPa;
applying the patch to the living tissue so that the plurality of microneedles penetrate into the living tissue;
absorbing one or more drugs, analytes, compounds, molecules, or biomarkers contained in the fluid of the living tissue into the plurality of microneedles; and
removing the patch from the living tissue.

* * * * *